United States Patent
Sabripour

(10) Patent No.: US 12,463,716 B1
(45) Date of Patent: Nov. 4, 2025

(54) LOW EARTH ORBIT SATELLITE CONSTELLATION SYSTEM

(71) Applicant: CesiumAstro, Inc., Austin, TX (US)

(72) Inventor: Shey Sabripour, Austin, TX (US)

(73) Assignee: CesiumeAstro, Inc., Austin, TX (US)

( * ) Notice: Subject to any disclaimer, the term of this patent is extended or adjusted under 35 U.S.C. 154(b) by 0 days.

(21) Appl. No.: 15/898,125

(22) Filed: Feb. 15, 2018

Related U.S. Application Data

(63) Continuation-in-part of application No. 15/877,959, filed on Jan. 23, 2018, now abandoned.

(60) Provisional application No. 62/459,521, filed on Feb. 15, 2017, provisional application No. 62/449,318, filed on Jan. 23, 2017.

(51) Int. Cl.
*H04B 7/185* (2006.01)
*H04B 7/19* (2006.01)
*H04B 7/195* (2006.01)
*H04W 84/06* (2009.01)

(52) U.S. Cl.
CPC ..... *H04B 7/18521* (2013.01); *H04B 7/18539* (2013.01); *H04B 7/18543* (2013.01); *H04B 7/18584* (2013.01); *H04B 7/19* (2013.01); *H04B 7/195* (2013.01); *H04W 84/06* (2013.01)

(58) Field of Classification Search
CPC .. H04B 7/18521; H04B 7/19; H04B 7/18543; H04B 7/18539; H04B 7/195; H04B 7/18584; H04W 84/06
See application file for complete search history.

(56) References Cited

U.S. PATENT DOCUMENTS

| | | | | |
|---|---|---|---|---|
| 6,157,621 A * | 12/2000 | Brown | ............... | H01Q 1/242 370/310 |
| 9,590,722 B2 * | 3/2017 | Wyler | ............... | H04B 7/18513 |
| 2004/0110467 A1 * | 6/2004 | Wang | ............... | H04B 7/18513 455/12.1 |
| 2004/0185775 A1 * | 9/2004 | Bell | ............... | H04B 7/18515 455/12.1 |
| 2014/0105100 A1 * | 4/2014 | Tronc | ............... | H04B 7/18513 370/321 |
| 2016/0037434 A1 * | 2/2016 | Gopal | ............... | H04W 40/246 370/316 |
| 2016/0149599 A1 * | 5/2016 | Lindsay | ............... | H04B 1/0475 455/13.1 |
| 2016/0226155 A1 * | 8/2016 | Warnick | ............... | H01Q 21/0075 |
| 2017/0294957 A1 * | 10/2017 | Ravishankar | ............... | H04B 7/18528 |
| 2018/0227043 A1 * | 8/2018 | Dankberg | ............... | H04B 7/18515 |
| 2018/0376393 A1 * | 12/2018 | Wu | ............... | H04B 7/18521 |
| 2019/0020406 A1 * | 1/2019 | Lindqvist | ............... | H01Q 1/1257 |
| 2020/0328803 A1 * | 10/2020 | Cooke | ............... | H04W 36/26 |
| 2024/0250750 A1 * | 7/2024 | Kim | ............... | H04B 7/18513 |

* cited by examiner

*Primary Examiner* — Yu-Wen Chang
(74) *Attorney, Agent, or Firm* — Hogan Lovells US LLP

(57) ABSTRACT

In some embodiments, a communications system can include a plurality of low earth orbit (LEO) satellites deployed at different altitudes and configured to communicate with one or more terrestrial devices and with one another. The communications system may further include a plurality of geosynchronous (GEO) satellites deployed above the plurality of LEO satellites. The plurality of LEO satellites may cooperate with one another and with the plurality of GEO satellites to provide a global communication network having redundant point-to-point communication.

10 Claims, 12 Drawing Sheets

LOW EARTH ORBIT SATELLITE CONSTELLATION SYSTEM

CROSS-REFERENCE TO RELATED APPLICATION(S)

This application is a non-provisional of and claims priority to U.S. Provisional Patent Application No. 62/459,521 filed on Feb. 15, 2017 and entitled "Low Earth Orbit Satellite Constellation System", and is a continuation-in-part of and claims priority to U.S. patent application Ser. No. 15/877,959 filed on Jan. 23, 2018 and entitled "Low Earth Orbit Satellite Constellation System," which claimed priority to U.S. Provisional Patent Application No. 62/449,318 filed on Jan. 23, 2017 and entitled "Low Earth Orbit Satellite Constellation System", each of which are incorporated herein by reference in their entireties.

FIELD

The present disclosure is generally related to data, voice and streaming video Internet services providing global coverage, and more particularly to a low earth orbit satellite constellation system configured to provide world-wide data, voice and video streaming Internet services. More particularly, the present disclosure can include devices and methods of directing agile, reshapable, electronically steerable radio beams to and from a constellation of satellites orbiting the earth at different altitudes and configured to facilitate point-to-point communications while avoiding multiple hops involving numerous gateways with associated landing rights and potential loss of security and resiliency.

BACKGROUND

Global demand for information is increasing. Such demand can include Internet services, high definition (HD) and ultra-high definition (UHD) video, data, geophysical mapping, remote sensing data, earth observation data, global security and reconnaissance data, and so on. Various communication systems are designed to operate on the Earth's surface or in conjunction with satellites orbiting the Earth at prescribed altitudes and orbit inclinations. The term inclination refers to the angle the plane of the orbit makes relative to the plane of the Earth's equator.

Satellite orbits can be categorized in three altitude ranges: Low earth orbit (LEO) from 150 to 2,000 Km; medium or intermediate earth orbit (MEO) from 10,000 to 20,000 Km; and high earth orbit (HEO) from 35,000 Km and above. A satellite in a geosynchronous Earth orbit may be within an HEO range from the Earth's surface and may have an orbital period the same as the Earth's rotation period. A satellite that orbits the Earth in the HEO range may be a geosynchronous satellite that revolves around the Earth with a period of one sidereal day and that returns to the same position in the sky after each sidereal day. From the perspective of a fixed point on the Earth's surface, such satellites trace paths (analemmas) in the sky that repeat every day, which paths are generally elliptical, teardrop shaped, or figure-8 in shape depending on the parameters of the orbits. A subset of geosynchronous satellites includes geostationary satellites, which may be aligned to the Earth's equatorial plane which maintains a fixed position over the Earth's surface by revolving around the Earth synchronously with the Earth's rotation. A geostationary satellite (GSO) therefore ideally remains stationary relative to the Earth's surface, staying over a single point on the equator. In reality, such satellites are not precisely geostationary and may trace small analemmas in the sky. Communications satellites (and some weather satellites) are often placed in geostationary orbits, so that the satellite antennas (located on Earth) that communicate with them do not have to rotate to track them, but can be pointed permanently at the position in the sky where the satellites are located.

Satellites in medium earth orbit (MEO) may orbit the earth within the range from 10,000 Km to 20,000 Km (about 6,000 miles to about 12,000 miles) above the Earth's surface, which range is higher than low earth orbit (LEO) satellites but lower than GEO satellites. MEO satellites in this region often include satellites for navigation, communication, and geodetic/space environment science, although some also serve the telecommunications industry.

LEO satellites may orbit earth within a range from about 160 Km (99 miles) to about 2,000 Km (1,200 miles) above the Earth's surface. LEO satellites may be used for communications as well as monitoring the Earth's atmosphere and surface. LEO and MEO satellites may be referred to as non-geostationary (NGSO) satellites.

SUMMARY

In some embodiments, an apparatus may include a modular, scalable, and software-configurable satellite device including active phased array antennas with embedded channelization and packet processing functionality. The apparatus may include a modular spacecraft bus coupled to a pair of deployable solar wings and coupled to a plurality of transmit/receive active phased array antennas. In some aspects, the active phased array antennas may include a plurality of receive elements coupled to low noise amplifiers (LNA), digitally programmable phase shifters, and variable gain attenuators, transmit/receive switch and a power combiner subsequently connected to inputs of a down converter, which has its outputs coupled to analog-to-digital converter (ADC) circuit. The ADC circuit may provide outputs, first to a series of half-band filters, digital decimation/finite impulse response (FIR) filters, gain stages, then to a regenerative processor and channelizer circuit, utilizing a field programmable gate array (FPGA). The regenerative processor and channelizer circuit may communicate with the transmit circuit of the phased array antenna through a crossbar switch network or to a processing circuit (such as a single board computer (SBC)) through a serializer circuit, and an intra-system connector. The processing circuit may include an Advanced Reduced-Instruction-Set-Computer (RISC) Machine (ARM) processor. Further, the processing circuit may be coupled to a power conditioning unit. The receive elements, the LNAs, digitally programmable phase shifters, and variable gain attenuators, transmit/receive switch and a power combiner are subsequently connected to the down converter circuit, the ADC circuit, the regenerative processor and channelizer circuit, the processing circuit, the crossbar switch network, the serializer circuit, the intra-system connector, and the power conditioning unit may be embedded within each tile of the active phased array antenna. The modular spacecraft bus may carry multiple phased array antennas and may facilitate communication between the various tiles.

In some aspects, the active phased array antennas may also include a digital-to-analog (DAC) circuit including inputs coupled to the processing circuit through the intra-system connector, a de-serializer, and, in some cases with a cross bar switch network. Further, the active phased array antennas may include the regenerative processor and channelizer utilizing an FPGA. The digital baseband signal is processed through a series of half-band filters, digital pre-distortion circuits, quadrature error correction circuits, an interpolator with digital multi-tap FIR filters, and then fed to a DAC circuit which is then coupled to one or more transmit elements through an up-converter circuit, various filters, power dividers, a power amplifier (PA) and an output power detector. Each DAC and its supporting digital transceiver circuits, the processing circuit, the intra-system connector, the de-serializer, the crossbar switch network, the up-converter circuit, the power dividers, filters, digitally programmable phase shifters, variable gain attenuators, the power amplifiers, the output power detectors, and the transmit elements may be embedded within each tile of the active phased array antenna. The modular spacecraft bus may carry multiple phased array antennas and may facilitate communication between the various tiles.

In some embodiments, the satellite device may be configured to utilize embedded channelization and packet processing functionality (utilizing an FPGA within the active phased array antennas and the regenerative processor and channelizer in conjunction with the processing circuit) to provide enhanced point-to-point communication through a mesh network of satellite devices while avoiding ground hops and avoiding numerous gateways with associated landing rights and loss of security and resiliency.

In some embodiments, a plurality of modular, scalable, and software-configurable satellite devices may be deployed in orbit about the Earth at one or more altitudes. Each of the satellite devices may be configured to determine dynamically a selected path (such as an optimal path) from point-to-point through the mesh network between the forward and aft satellites in a given plane, between a satellite and an upper or lower layer satellite(s) and/or to a GSO satellite, to perform channelization and packet processing on received signals, and to route data packets through the selected path. In a particular embodiment, the satellite devices may be deployed in a multi-layer LEO and GSO mesh network configuration, and the satellite devices can be configured to route data through mesh network to facilitate point-to-point communication. In some embodiments, the communication path may be from a source (such as a source on the ground or within the mesh network) to a destination (such as a destination on the ground or within the mesh network).

In some embodiments, a communications system can include a plurality of low earth orbit (LEO) satellites deployed at different altitudes and configured to communicate with one or more terrestrial devices and with one another. The communications system may further include a plurality of geosynchronous (GEO) satellites deployed above the plurality of LEO satellites. The plurality of LEO satellites may cooperate with one another and with the plurality of GEO satellites to provide a global communication network having redundant point-to-point communication and avoiding interference with other GSO and NGSO systems. In certain embodiments, each of the LEO satellites and the GEO satellites may include embedded channelization and packet processing functionality to enable point-to-point communication from a source to a destination through the network of LEO and GEO satellites while avoiding multiple ground hops and numerous gateways and their associated landing rights and corresponding loss of security.

In some embodiments, the communications system may further include one or more communication devices configured to communicate with the LEO satellites and the GEO satellites, substantially concurrently, predictively and/or dynamically. Each communication device on earth may include at least two receivers configured to receive signals at frequencies greater than 10 GHz and at least two transmitters configured to send signals at frequencies greater than 10 GHz. In one aspect, the communication device can receive at approximately 20 GHz (17.7-21.2 GHz) and transmit at approximately 30 GHz (27.5-31 GHZ). In another aspect, the two software-defined receivers and the two software-defined transmitters are integrated within the communication device, comprising a software defined multi-beam active phased array antenna(s). In yet another aspect, the communication device can include an interface configured to couple to an antenna system including the at least two receivers and the at least two transmitters. In still another aspect, the communication device can be a smartphone, a satellite phone, or another communications device configured to communication voice data, text data, video data, or any combination thereof through the satellite network.

In some embodiments, the communication device may be configured to send data packets including, in some cases, where quality of service is paramount, at least two identifiers corresponding to two different LEO satellites of the plurality of LEO satellites and on some occasions including one corresponding to a GEO satellite (or leased transponder channels on existing GSO satellites thereof) of the plurality of satellites. In at least one aspect, the communications device may send data (voice, video, text, images, multimedia, or any combination thereof) to multiple LEO satellites and, on some occasions, one of a GEO satellite and an intermediate satellite ("MEO" between the GEO and LEO satellites in terms of altitude) at the same time, enabling redundant multi-path communication through a mesh network formed by the plurality of satellites.

In some embodiments, receiving satellites of the plurality of LEO satellites and the plurality of GEO satellites are configured to interrupt transmission of radio frequency signal, switch frequencies or adjust their effective power flux density (EPFD) to coordinate with GSO and other NGSO satellite communication providers and space and terrestrial terminals, meeting the International Telecommunication Union (ITU) and other national RF communication regulatory requirements. Each communication packet in these embodiments may have redundant network paths that can be dynamically selected by one or more of the plurality of LEO and GEO satellites in the constellation for path optimization, delay minimization, maximum link margin, other communication parameters, or any combination thereof. Digital or photonic switching networks within the satellites and between the satellites may utilize adaptive, cognitive spatiotemporal software to manage the network. Further, each satellite may utilize embedded channelization and packet processing to facilitate dynamic communication path identification, selection, and adjustment to provide enhanced point-to-point communication. Connection to the Internet and other terrestrial global information grid is provided using gateway terminals configured to link the satellite network to the terrestrial network infrastructure. In some embodiments, at least two of the plurality of LEO satellites and in some cases one of the plurality of GEO satellites (when in view) receive data from a terrestrial device and forward the data via separate data paths to a destination device via the plurality of LEO satellites, for user-to-user and user-to-gateway and the plurality of GEO satellites for broadcast modes of operation. Further, each of the LEO satellites and optionally one-or-more of the GEO satellites may be configured with embedded channelization and packet processing functionality to enable point-to-point communication through the satellite mesh while avoiding multiple ground hops (communication connections to gateway terminals).

In a particular embodiment, a communication system includes a plurality of LEO satellites deployed at a minimum of three different altitudes within a range corresponding to low earth orbit. Further, the communication system includes a plurality of GEO satellites deployed within a range of GSO altitudes. In some embodiments, the communication system may also include one or more MEO satellites deployed at an intermediate altitude between the GEO satellites and the LEO satellites.

In all embodiments the satellites' active phased arrays utilize embedded distributed wide-band channelizer functionality within each modular active phased array tile, which also incorporates an on-orbit reconfigurable, reprogrammable FPGA, as well as a multi-core single board computer to provide a complete regenerative baseband to modulated radio frequency (RF) payload in a scalable tile. This functionality may enable optimization of in-orbit packet routing within the LEO satellite layers as well as routing of data through LEO-GEO inter satellite links. Network management and routing protocols can be performed in-orbit and, therefore can provide unmatched security and resiliency. In some embodiments, optimization codes for adaptive, channel dependent modulation can be used in conjunction with space, code, time, frequency, and polarization multiple access methods can be software defined and heuristically optimized in orbit.

In some embodiments, the channelizer enables isolation and decomposition of any modulated multi-carrier waveform into baseband information bits. Thereafter, the baseband information bits may be re-packed, encoded, and re-modulated onto a new multi-carrier waveform within a transmit beam the same tile or any other beams of the active phased array. This ability to repackage, encode, and remodulate baseband information bits from received signals onto new multi-carrier waveforms may provide a desired flexibility, spectral efficiency, and signal-to-noise ratio as well as resilience as compared to unprocessed or bent pipe payloads.

Embodiments of satellite modules described below include embedded channelizer functionality within each active phased array tile enabling distributed channelization functionality. Further, the channelization functionality expands with the number of tiles, beams, and apertures.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
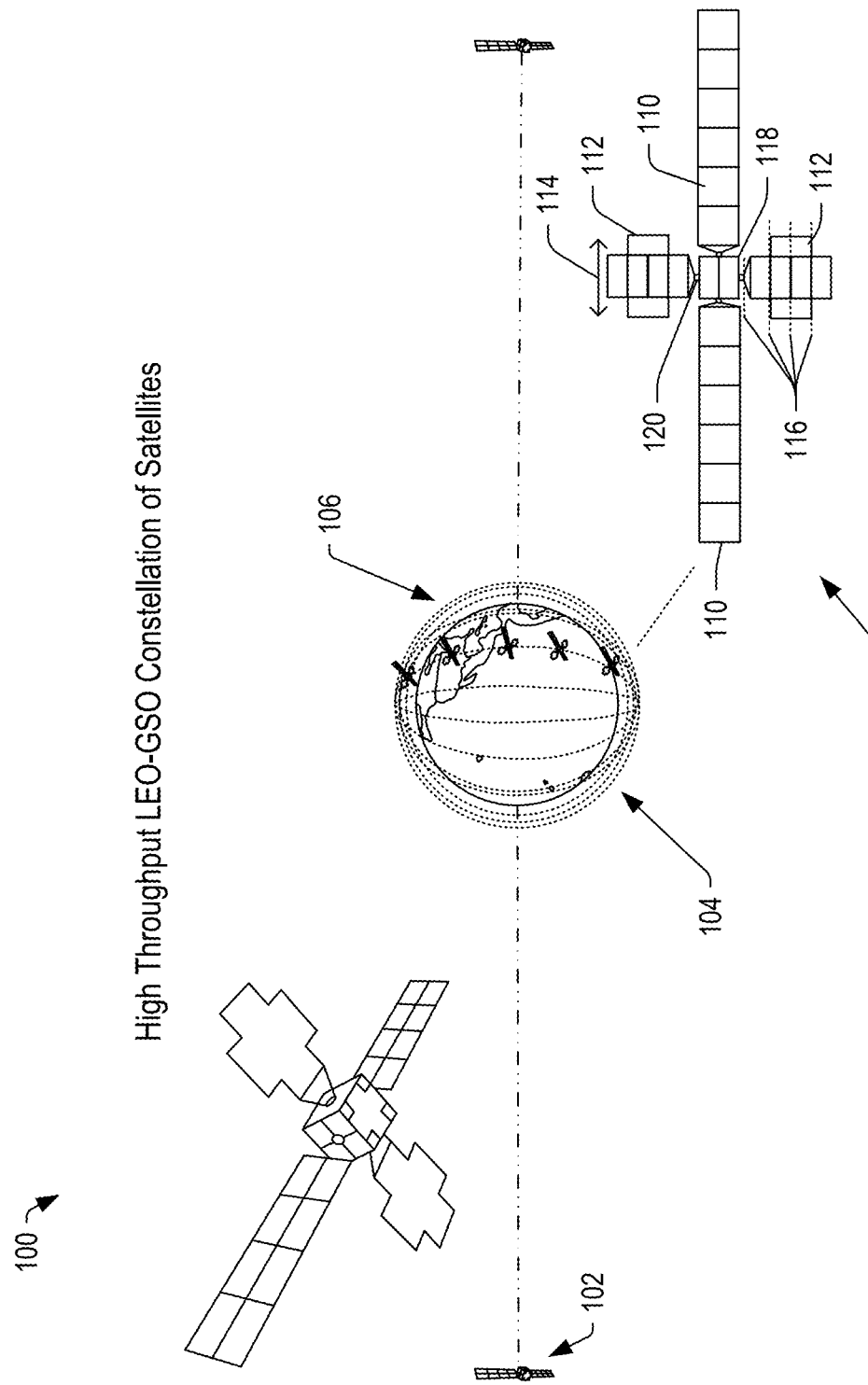
FIG. 1 depicts a high throughput satellite system including low earth orbit (LEO) and geostationary (GEO) constellation, in accordance with certain embodiments of the present disclosure.

Embodiments of a communication system are described below that can be used to provide high throughput data, video and voice communications globally. The communication system may include a multi-layer (multicomponent or multi-path) array of satellites orbiting the Earth at different altitudes. The communication system may include a unique mix of Non-Geostationary Satellite Orbit (NGSO) and Geostationary Satellite Orbit (GSO) configured to operate seamlessly. In some embodiments, the satellites may be configured to predictively and or dynamically utilize mechanical and electronic articulations of the deployed antenna phased arrays in order to limit the equivalent power flux density interference when the LEO (NGSO) segment of the constellation is in direct view of the pre-existing GSO operators. This unique combination of network architecture and active phased array technology can enable a successful deployment of a NGSO/MEO/GSO communications satellite constellation within the guidelines of the International Telecommunication Union (ITU) and existing operators in the frequency bands of interest.

In some embodiments, the communication system can include a novel multi-layer low earth orbit (LEO) satellite system that can provide high throughput data, voice and multi-media services with a global coverage. In some embodiments, the LEO satellite system may include a plurality of satellites forming a communications mesh or NGSO and GSO constellation. This architecture is conceptualized as including a constellation of a plurality of modular, scalable, and software-enabled active phased array satellite devices. Each tile of the active phased array antennas of the satellite devices may include embedded channelization and packet processing functionality, which can enable point-to-point communication through the network of satellites using selected paths and selected channels, avoiding multiple ground hops and numerous interactions with gateways and their associated landing rights and corresponding loss of security and resiliency. In a particular implementation, the satellite constellation may include approximately 384 satellites, which can be deployed at different altitudes and in stages.

In some embodiments, the modular implementation of the satellite devices enables a staged deployment of satellites at different altitudes. In an example, multiple layers of satellite devices allows for progressive deployment, starting at higher altitudes to allow for initial operation with fewer satellites until usage increases. As usage demands, additional lower altitude satellite layers can be added, providing smaller cells and enhanced spectral efficiency and re-use. Intra-satellite and inter-satellite links provide for security, resiliency, and multi-path reliability (when needed) to provide point-to-point communication through the satellite network while avoiding or reducing the number of ground hops.

In a particular implementation, a first layer and initial operational system can include four orbital planes with nine satellites, each of which may be deployed at an altitude of approximately 1,275 Km. The inclination of these satellites can be near polar. This first layer can be increased to five planes of eleven satellites each. If five planes are used, the second and third layers (or planes) can be adjusted accordingly. The satellites in the first layer may be LEO satellites configured to receive data from and send data to each other and to communication devices on the Earth's surface. Each satellite may include a multi-phased array, where each tile of the array includes embedded channelization and packet processing functionality. In certain embodiments, the satellites in the first layer may be configured to receive redundant data transmissions from the communication devices on the Earth's surface and to send the data to a destination through redundant data paths within the satellite network (avoiding ground hops) to enhance resiliency, security, and throughput. In a particular example, the point-to-point communication can be performed at better than fiber speeds with optimal flexibility, security, and resiliency. To ensure global coverage and prevent interference from exiting GSO satellites, existing Ka band GSO service may be leased to augment this embodiment's LEO capacity or small GSO satellites operating at V Band (47.2-50.2 GHz Uplink and 37.5-40.5 GHz downlink) may be licensed and inserted in the system.

Upon successful deployment and operation of the first layer and when demand increases for the global network, a second layer of satellites can be deployed at an altitude of 875 Km in six planes of twenty-one satellites each. The satellites in these six planes may be LEO satellites that orbit the Earth at an altitude that is lower than the first layer and that may have inclinations that are near polar. The second layer satellites can be configured to communicate with the first layer of LEO satellites, with each other, and with communication systems on the Earth's surface. Like the satellites of the first layer, the satellites of the second layer may include multi-phased arrays of antenna tiles, each of which may include embedded channelization and packet processing functionality and may be configured to enable point-to-point communication through the satellite network while avoiding ground hops. In certain embodiments, the satellites in the second layer may be configured to receive the data transmissions from the communications devices on the Earth's surface in parallel with the reception by the satellites of the first layer. Further, these satellites may also send the data to a destination through one or more data paths (through the satellite network) to provide an additional redundant communication path. The second layer of the constellation may also be Ka Band or be changed to V band in another embodiment. In some embodiments, the communication band may be changed dynamically using software commands from a terrestrial control system.

Upon successful deployment and operation of this second layer and successful integration of the first and second layers of satellites and when customer demand projections reach a pre-determined goal, a third layer of the constellation of satellites can be deployed at 675 km and also at near polar inclination. This third layer can include nine planes of twenty-four satellites each. The satellites of the third layer may include multi-phased arrays of antenna tiles, each of which may include embedded channelization and packet processing functionality. The satellites of the third layer may be configured to communicate with each other, with satellites of the first layer, with satellites of the second layer, and with communication devices on the ground. In certain embodiments, the third layer satellites may be configured to receive redundant data transmissions from the communication devices on the Earth's surface and to send the data to a destination through redundant data paths (through the satellite network while avoiding ground hops) to enhance throughput in conjunction with the satellites of the first layer and the second layer.

In some embodiments, as the second and third layers of satellites are deployed, the system may incorporate a plurality of Ka Band satellites that may also be deployed, a plurality of GSO Ka Band satellites that may be leased, or any combination thereof, for network support and other frequency coordination aspects of the communication system.

In the following discussion of the various illustrated embodiments, it should be understood that the drawings are provided for illustration purposes only and to provide an understanding of the features and functionality of the various components and the overall system. However, the components are not necessarily drawn to scale. Further, it should be understood that the number of satellites, the number of phased array tiles, the selected altitude of deployment, and the particular components of the modular satellite devices may vary depending on the implementation and the intended functionality of the overall system. One possible example of a satellite system incorporating multi-phased array satellite devices where each phased array tile includes embedded channelization and packet processing functionality is described below with respect to FIG. 1.

FIG. 1 depicts a high throughput satellite system 100 including low earth orbit (LEO) and geostationary earth orbit (GEO) constellation, in accordance with certain embodiments of the present disclosure. The system 100 may include a multi-layer, progressively inserted, low earth orbit (LEO) satellite system (aka non geostationary satellite orbit, NGSO) that will provide high throughput Internet data, video and voice to fixed and mobile users across the globe. The architecture can include a plurality of NGSO satellites, which may be deployed as a constellation. In a particular embodiment, the constellation may include 384 NGSO satellites. In the illustrated example, the high throughput satellite system 100 depicts one of six GSO small satellites 102, one of three LEO (NGSO) orbital layers 104, one of twenty-one LEO orbital planes 106 consisting of 378 NGSO small satellites 108 in three progressively deployed layers, and one of three small phased array satellites. In the illustrated example, the NGSO small satellite 108 may be a 150 Kg class satellite. Each NGSO small satellite 108 may include a pair of solar wings 110, each of which may produce 1 KW of power. Further, each NGSO small satellite 108 may include a pair of transmit/receive active phased array antennas 112 with articulating joints. In this example, each transmit/receive active phased array antenna 112 may include a 1.22 m aperture 114. Each transmit/receive active phased array antenna 112 may include a plurality of articulating joints 116. The solar wings 110 and the transmit/receive active phased array antennas 112 may be coupled to a modular spacecraft bus via a fiber optic and DC antenna to spacecraft interface 118.

The system 100 may include four satellite constellation layers that that can be established sequentially. In an example, the timing of the launch and insertion of each subsequent layer may be based, at least in part, on demand growth. The first layer may include a system with 55 satellites, which may be divided into 5 near-polar orbital planes with 11 satellites in each plane. The orbital altitude of this layer may be approximately 1275 km above earth's surface, to keep the satellites below the Van Allen radiation belt.

The second layer may consist of 133 satellites comprised of 7 planes with 19 satellites in each plane, again with near polar inclination. In some embodiments, the second layer may be deployed once a successful technical and business operation of the first layer is established and in response to increases in the demand for the network. The altitude for this second layer may be targeted at 875 km and inclination may also be near Polar. In a particular embodiment, the second layer may be deployed in a Walker-Delta configuration.

Subsequently, the third layer can be deployed in a 675 km orbit with the same near-polar inclination. This layer can include 9 planes and 21 satellites in each plane for a total of 189 satellites in this third layer. In a particular embodiment, the third layer may be deployed in a Walker-Delta configuration.

The fourth layer may include 6 small satellites in geostationary orbit (GSO), which may provide network support, coordination, management network resiliency or broadcast services. In certain embodiments, this fourth layer can provide continuous constellation coverage when the LEO layers are kept below the GSO equivalent power flux density (EPFD) limits and frequency. Until frequency coordination approvals are obtained from ITU, approximately 6-12 transponders could be leased from GEO operators already operating in the regions of interest.

In a particular embodiments, each of the satellites within the four LEO and GSO layers can be configured to operate in the ITU coordinated Ka-Band frequency range to facilitate user-to-satellite (uplink) and satellite-to-user (downlink) communication links, assuming the system is awarded a priority for usage of this frequency. If the Ka Band license becomes untenable, the satellites within the four LEO layers may be reconfigured or replaced to operate in the V Band for more available bandwidth and smaller spot beams. The communications links between the LEO satellites and the GSO satellites (also known as inter-satellite links, ISL) can use Ka or V Band frequencies, or another frequency band reserved for satellite communications. In some embodiments, photonic links can be used for the ISL network operations and backhaul. In a particular embodiment, the satellites may be configured to communicate using Ka band frequencies, V band frequencies, Ku band frequencies, photonic links, another frequency band, or any combination thereof.

The system 100 may include unique mix of NGSO-GSO satellites configured for seamless operation and communications. More importantly, the system 100 may predictively and dynamically use mechanical and electronic articulations of the deployed phased array antennas of the various LEO and GEO satellites to limit the equivalent power flux density interference when the LEO (NGSO) segment of the constellation is in direct view of the pre-existing GSO operators. This unique combination of network architecture and technology of the system 100 can enable a successful deployment of the communications satellite constellation within the guidelines of the ITU and existing operators in the frequency bands of interest.

The system 100, when fully deployed, is depicted in FIG. 1. Assuming an initial layer of 90 satellites at an orbital altitude of 1275 km, the orbital period is approximately 111 minutes and the inclination is 89.6 degrees or similar. The target footprint per satellite is a 3,642 km in diameter. The total coverage area would be divided into approximately 200 cells, with the cell size ranging from 175 to 250 km, depending on the cell's position in the cluster (cells at the edge of the cluster are wider due to the approximately constant beam width). Satellite-to-user links may utilize the Ka-band spectrum, with the downlink near 20 GHz and the uplink near 30 GHz. A total bandwidth of 2 GHz is assumed, with 1 GHz allocated for the uplink and 1 GHz allocated for the downlink.

In the system 100, each of the LEO satellites in the constellation may be a modular, scalable, and software-enabled active phased array satellite device including multiple phased array antennas. Each tile of the active phased array antennas of the satellite devices may include embedded channelization and packet processing functionality, which can enable point-to-point communication through the network of satellites using selected paths and selected channels, avoiding multiple ground hops and numerous interactions with gateways and their associated landing rights and corresponding loss of security and resiliency.

In some embodiments, the channelizer enables isolation and decomposition of any modulated multi-carrier waveform into baseband information bits. Thereafter, the baseband information bits may be re-packed, encoded, and re-modulated onto a new multi-carrier waveform within a transmit beam the same tile or any other beams of other tiles of the active phased array. This ability to repackage, encode, and remodulate baseband information bits from received signals onto new multi-carrier waveforms may provide a desired flexibility, spectral efficiency, and signal-to-noise ratio as well as resilience as compared to unprocessed or bent pipe payloads. Further, this functionality enables communication of data through the satellite network while avoiding ground hops, reducing potential security issues.

Figure 2:
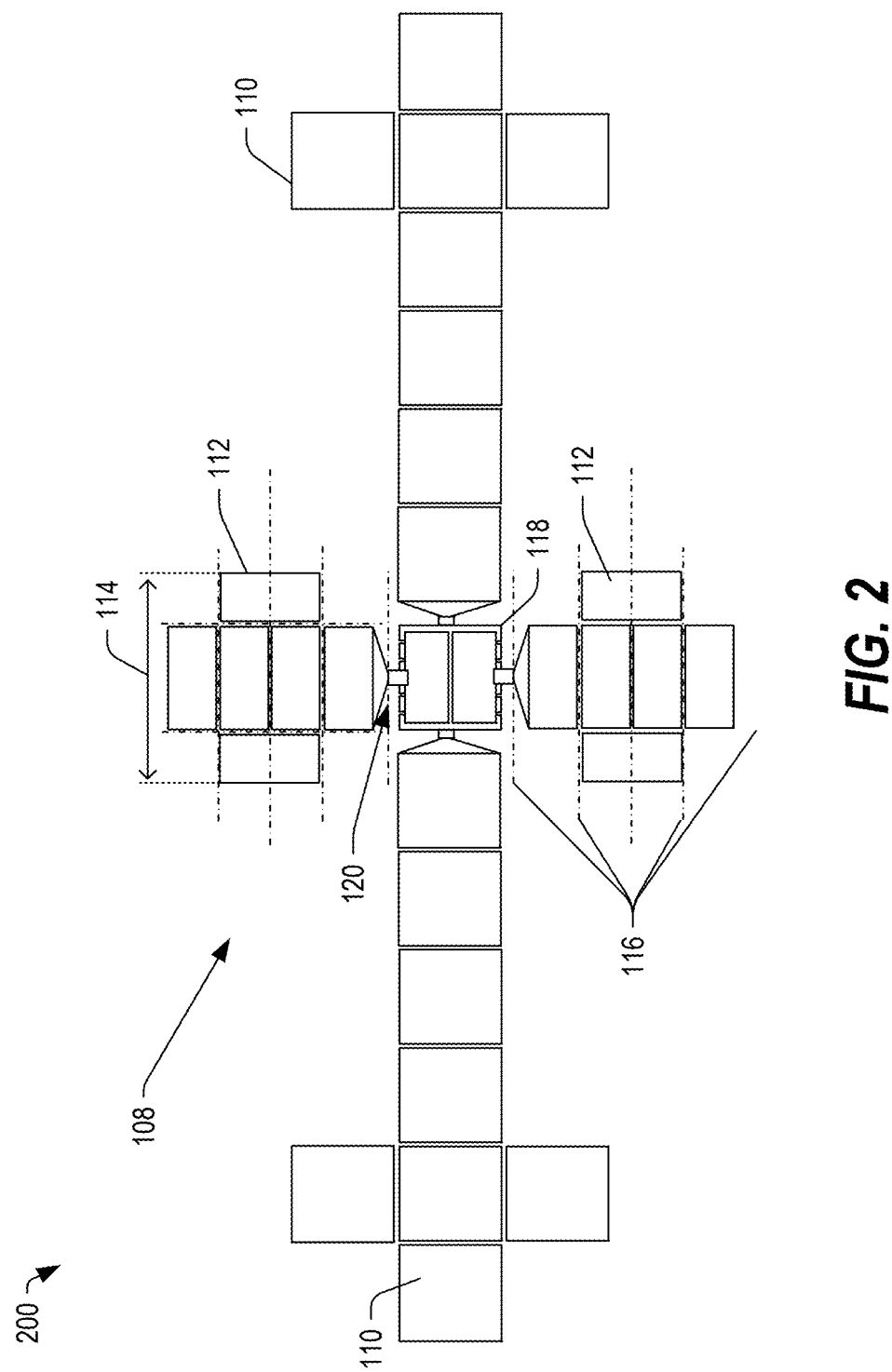
FIG. 2 illustrates a simplified diagram of a LEO satellite that can be deployed as part of the high throughput satellite system, in accordance with certain embodiments of the present disclosure.

FIG. 2 illustrates a simplified diagram of a LEO satellite 200 that can be deployed as part of the high throughput satellite system, in accordance with certain embodiments of the present disclosure. In the illustrated example, the satellite 200 may be one of a plurality of such satellites, each of which may include multi-beam phased array. The satellite 200 may include a spacecraft bus 118, two solar array wings 110 that can be deployed or retracted, and two active phased array antenna wings 112 that can be deployed or retracted. The phased array antenna wings 112 can be electronically steered, and at least four panels of each of the two phased array antenna wings 112 can also be mechanically steered.

The phased array antenna wings 112 may include a plurality of actuators configured to selectively steer one or more panels, mechanically.

Each of the two antenna wings 112 can be divided into 6 further articulated antenna array modules. In a particular embodiment, the antenna wings 112 can be approximately 1.22 meters on a side, depending on the exact array combination. Each array 112 may have dual polarization and may provide a total of 200 beams per polarization: one beam per polarization for each cell within a coverage area. Further, each tile of the active phased array antennas 112 of the satellite devices may include embedded channelization and packet processing functionality, which can enable point-to-point communication through the network of satellites using selected paths and selected channels, avoiding multiple ground hops and numerous interactions with gateways and their associated landing rights and corresponding loss of security and resiliency. Each antenna wing 112 may include Nadir and Zenith pointing double-differenced GPS antennas for the phased array and Spacecraft Attitude Determination enhancement.

Each satellite 200 may be configured to generate approximately 2.5-4.5 kW of DC power. In some embodiments, from the 2.5 kW, approximately 100 W may be allocated for spacecraft housekeeping functions and another 250 W may be used for onboard digital signal processing and channelization. Assuming a direct current (DC) to radio frequency (RF) efficiency of 25%, approximately 530 W of RF power may be available for the two deployed antenna wings. During the orbit-raising maneuver, nearly all of the solar array power (approximately 2.2 kW) can be available to the all-electric propulsion on the spacecraft. Once at the proper altitude and station, the power requirement for station keeping may be kept to a minimum and performed during low user-density orbit locations.

Active array wings with sub-array mechanical articulation and electronic steering may be unique to the satellites 200 forming the communications constellation. In addition to providing Earth-fixed cells and enabling seamless user handoffs, steering capability can ensure noninterfering operation with other NGSO and GSO operators. Each satellite 200 may include a distributed network management system, which may be housed within the spacecraft bus 118. The distributed network management system can be part of the LEO and GEO components of the constellation and can utilize a heuristic algorithm that may selectively modify the pointing of the spacecraft antennas at the array wing-level. Further, the distributed network management system may utilize the heuristic algorithm to control the mechanical adjustments of the sub-array panels to maximize power and beam patterns to high density user areas while minimizing interference to other NGSO and GSO operators.

In some embodiments, each satellite 200 may also utilize multifunctional composite honeycomb structural components. Small credit-card sized avionics hardware can be embedded within modular spacecraft bus structures and can be connected via rigid-flex printed circuits, nearly eliminating all point-to-point wiring found in traditional spacecraft buses. Laminar, mixed high and low atomic number radiation shielding materials, can be placed within the multifunctional structural components. Several modules that make up the spacecraft bus can be designed modularly to enable assembly of the satellites within a matter of minutes. In a particular example, the components may be configured to snap fit and lock together, enabling fast assembly and robust plug-and-play type functionality.

It should be appreciated that the modular satellite implementation and the embedded functionality enable the roll out of the satellites in stages. Further, it should be appreciated that the orbital parameters may vary according to the particular implementation and the desired functionality. One possible implementation is described below with respect to FIG. 3.

Figure 3:
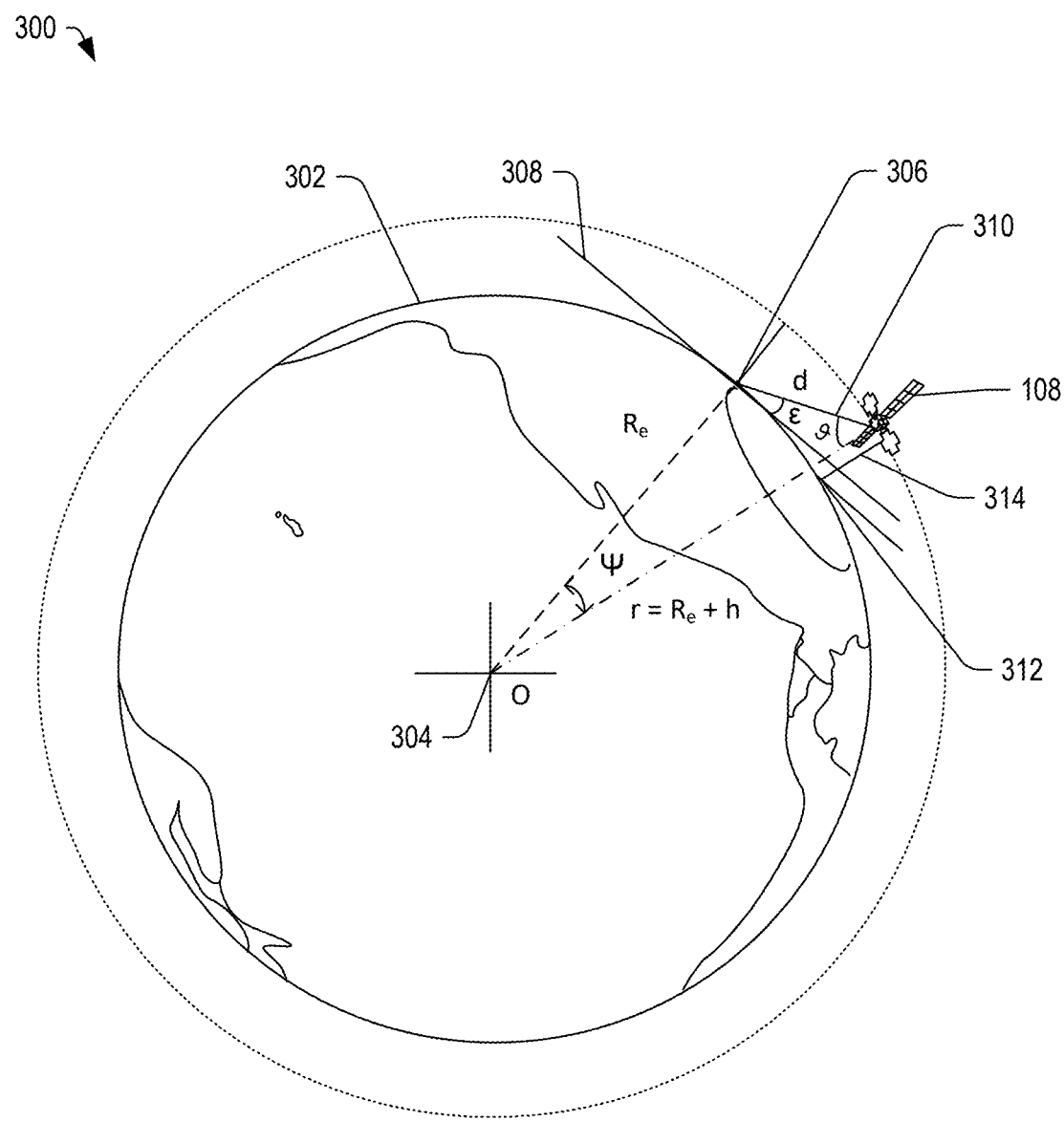
FIG. 3 depicts orbit parameter definitions of portions of the high throughput satellite system of FIG. 1, in accordance with certain embodiments of the present disclosure.

FIG. 3 depicts orbit parameter definitions of portions 300 of the high throughput satellite system of FIG. 1, in accordance with certain embodiments of the present disclosure. In the illustrated example, the earth 302 is shown and includes a mark indicating the center of the earth (O) 304. The drawing shows a user's line of horizon 308 and an earth station terminal 306. A first line from the center of the earth 304 to the earth station terminal 306 and a second line from the center of the earth 304 to the satellite 108 defines an angle (Y). A line 310 from the earth station terminal 306 to the satellite 108 defines an angle (E) relative to the user's line of horizon 308. Further, the line 310 from the earth station terminal 306 to the satellite 108 and the line from the center of the earth 304 to the satellite define an angle(s). Further, the line 314 defines a height (h) relative to the earth's surface. Further, the drawing shows a Nadir sub-satellite point 312. In some embodiments, the satellite radius (r) may be specified by the following equation:

$$r = h + R_e \quad (1)$$

In equation (1), the variable (r) represents the satellite distance to the center of the earth in meters, h is the satellite altitude above the earth's surface in meters, and $R_e$ is the mean equatorial radius of earth taken as 6,378 km. Therefore, the satellite radius can be calculated to be approximately 7,653 km.

Further, the satellite velocity can be determined by the following equation:

$$v = \sqrt{\frac{\mu}{r}} \quad (2)$$

In equation (2), the variable ($\mu$) is determined as follows: $\mu = GM_e = 3.9861 \times 10^{14}$ m$^3$/s$^2$, where $G = 6.6732 \times 10^{-11}$ N m$^2$/kg$^2$ is the universal gravitational constant and $M_e = 5.9733 \times 10^{24}$ kg is mass of the earth. From equation (2), the satellite's velocity may be determined to be approximately 7,217 m/s.

The orbital period of the satellite can be calculated according to the following equation:

$$T = \frac{2\pi r}{v} \quad (3)$$

where the variable (T) refers to the satellite orbital period in seconds, the variable (r) is the satellite radius from the center of the earth in meters, and the variable (v) is the satellite's velocity in meters per second. Therefore, the satellite's orbital period can be calculated to be approximately 111 minutes and 2.7 seconds.

To estimate the first layer constellation parameters, let the elevation angle ($\varepsilon$), in radians, be the angle at which a user can see the satellite above the horizon. Further, let the nadir angle ($\nu$), also in radians, denote the deflection of the user from the nadir N (aka the sub-satellite point) as seen from the satellite. Also, let the angle ($\psi$), in radians, denote the Earth's central angle, which is the angle between the sub-satellite point N and the user terminal T. Thus, the Earth's central angle may be determined according to the following equation:

$$\psi = \frac{\pi}{2} - V - \varepsilon = \arccos\left(\frac{R_e}{r}\cos\varepsilon\right) - \varepsilon \qquad (4)$$

Additionally, the nadir angle (v) can be determined according to the following equation:

$$v = \arcsin\left(\frac{R_e}{r}\cos\varepsilon\right) = \arctan\left(\frac{\sin\psi}{\frac{r}{R_e} - \cos\psi}\right) \qquad (5)$$

The elevation angle (ε) may be determined from the following equation:

$$\varepsilon = \arctan\left(\frac{\cos\psi - \frac{R_e}{r}}{\sin\psi}\right) = \arccos\left(\frac{r}{R_e}\sin v\right) \qquad (6)$$

The Slant Range (d) can be calculated as follows:

$$d = \sqrt{R_e^2 + r^2 - 2R_e r \cos\psi} \qquad (7)$$

These equations yield the Earth central angle ψ to be approximately 13°, the satellite nadir angle v to be approximately 45°, and the assumed elevation angle (mask angle) to be approximately 32°. The slant range, d, for the edge of the beam coverage is calculated to be approximately 2,034 km. It should be understood that this is a low elevation angle, and the low elevation angle may necessitate a larger, more complex user antenna. However, the first layer of the constellation of satellites may cooperate to establish a global communications network through staged deployment.

To calculate the rest of the pertinent first layer constellation parameters, it is possible to determine the area of the spherical cap A from the following equation:

$$A = 2\pi R_r^2 (1 - \cos\psi_{max}) \qquad (8)$$

Adjusting the satellite altitude iteratively drives the approximate number of satellites that may be required for a polar constellation and may iteratively determine other parameters previously calculated. The satellite altitude can be approximated using equation the equations below:

$$h = R_e\left(\frac{\cos\varepsilon_{min}}{\cos(\psi + \varepsilon_{min})} - 1\right) \qquad (9)$$

$$N \approx \frac{4}{1 - \cos\phi_{max}} \qquad (10)$$

In equation 9, the variable h represents the number of nearly polar plane. In equation 10, the variable N represents the number of satellites in each plane. In one possible optimization for the first constellation layer, the constellation may include five nearly polar planes with eleven satellites in each plane. The number and configuration of the satellites within the first layer may be adjusted continuously or may be adjusted in conjunction with the ITU and other operators.

In some embodiments, the constellation of satellites 200 that provide the communication system may include three (3) layers of satellites that include a total of approximately 378-satellites, which may be at one or more altitudes and which may include a mix of polar and Walker Delta inclinations. In some embodiments, assuming a consistent altitude for all of the satellites allows for a rough estimate of the total capacity of the system. In some embodiments, the altitudes for the second and third layers of the constellation may be adjusted to a lower altitude for capacity and total system cost optimization. In some examples, the satellite size, weight, power, and cost (SWaP-C) as well as the user terminal SWaP-C goals may be continuously analyzed and reconsidered to meet both technical and business objectives of the final-state constellation system.

To estimate the throughput of a single satellite 200, the basic system parameters may be calculated. Conventionally, the target maximum commercial user data rates may be twelve (12) Mbps for the downlink and three (3) Mbps for the uplink. Each cell may be covered by one beam in each polarization, where the beam coverage is defined by the three decibels (3 dB) beam width ($\theta_{3dB}$). The actual value of the beam width $\theta_{3dB}$ can be calculated from the ratio of the distance between the center of a cell and the satellite and the radius of the cell. Assuming the altitude of the first constellation to be approximately 1,275 km and the radius of a small cell to be approximately 108 km, the beam width 03 dB is approximately 7.26 degrees for the cells in the center of the cluster. The necessary gain (G), in turn, can be approximated from the beam width according to the following equation:

$$G^* = \frac{28,918}{\theta_{3dB}^2}, \qquad (11)$$

In equation (11), the variable (G*) represents the antenna gain in actual ratio and $\theta_{3dB}$ is the half power antenna beam width in degrees. This determines an approximate boresight gain of 27.39 dBi. From this value, the physical area of the antenna can be estimated according to the following equation:

$$A = \frac{G^* \lambda^2}{4\pi\eta} \qquad (12)$$

In equation (12), the variable (A) represents the antenna area in meters squared, the variable (G*) represents the antenna gain in actual ratio, the variable (η) represents the antenna efficiency (which is taken to be approximately 55 percent), and the variable (λ) represents the signal wavelength in meters. The wavelength (λ) can be one (1) cm for a 30 GHz uplink and can be one and a half (1.5) cm for a 20 GHz downlink. The calculated area may give a minimum 0.34 m diameter for the 30 GHz antenna, and a minimum 0.14 m diameter for the 20 GHz antenna. The calculated antenna diameters imply approximately a 16×16 element array, assuming half-wavelength spacing. The actual size of the array and the number of the elements may be determined by additional factors, such as the ability to maintain the desired beam width over all steering angles. Therefore, the above calculations give only an estimate for the size and the gain of actual satellite and user terminal antennas.

In some embodiments, the total RF power per satellite can be 500 W. Therefore, each of the 100 beams may have 5 W or 7 dBW of RF power. Assuming the minimum gain of the antenna is approximately 24 dB at the edge of cell, then the total effective isotropic radiated power (EIRP) can be approximately 29 dBW.

The baseline channel sharing method for the satellite constellation can include code division multiple access (CDMA), assuming that the achievable transceiver bandwidth is equal to the allocated frequency bandwidth. In the case that the allocation exceeds the transceiver bandwidth, multi-frequency (MF)-CDMA can be utilized. Furthermore, MF-CDMA can allow for a dynamic allocation of data capacity. Specifically, cells (satellite beams) that operate at difference frequencies can be overlapped in densely populated areas, which increases the customer base (but does not change the overall available throughput of the satellite). In the following discussion, it is assumed that the satellites utilize CDMA, but the analysis applies to MF-CDMA also. In general, CDMA has several advantages: soft capacity limit, low transmit power spectral density, and soft handover between cells. Additionally, in CDMA communications, user synchronization is not necessary. Moreover, interference from other CDMA providers in the same band slowly degrades the performance without a hard limit.

One possible challenge associated with this CDMA method is that received carrier power for all users should be synchronized. More specifically, the total noise power density ($N_{tot}$) for a target channel in a cellular CDMA system may be determined according to the following equation:

$$N_{tot} = N_o + I_o = N_o + \frac{B_c}{R_b}\alpha(1+f)U\overline{E_b} \quad (13)$$

where the variable ($N_o$) represents the thermal noise density, the variable ($B_c$) represents the carrier (spread bandwidth), the variable ($\alpha$) represents the utilization ratio, the variable (f) represents the inter-cell interference factor, the variable (U) represents the number of channels, and the variable ($\overline{E_p}$) represents the average energy per bit for the channel other than the target channel. In this example, each of the values is expressed in linear units. The expression shows that the average energy per bit divided by the thermal noise density ($E_b/N_{tot}$) for a desired user scales as $E_b/\overline{E_b}$. Therefore, it may be desirable to keep $E_b=\overline{E_b}$, which may guarantee the $E_b/N_{tot}$ for all channels. Consequently, controlling the received $E_b$ (i.e. the received carrier power) may be desirable for reliable service.

In CDMA systems, the data capacity is generally limited by inter-channel interference ($I_o$), which can be seen from equation 13, since $I_o=\alpha (1+f) U E_b R_b/B_c$, where U is the number of channels. Alternately, a maximum number of available channels (i.e. no margins) can be expressed as follows:

$$U = 1 + \frac{B_c/R_b}{\alpha(1+f)}\left(\left(\frac{E_b}{N_{tot}}\right)_{min}^{-1} - \left(\frac{E_b}{N_o}\right)^{-1}\right), \quad (14)$$

where the variable ($\alpha$) represents the usage ratio (data is sent through an active channel only for a fraction of the connection duration), the variable ($B_c$) represents the carrier (spreading) bandwidth, the variable ($R_b$) represents the data rate, and the ratio $$\left(\frac{E_b}{N_{tot}}\right)_{min}$$

represents the minimum required ratio for a given BER. Further, the ratio $E_b/N_o$ represents the achieved ratio, and the variable (f) represents the inter-cell interference ratio. The variable ($N_{tot}$) represents the total (thermal+interference) noise power density. For this discussion, it is assumed a usage ratio ($\alpha$) of approximately 0.35 and an inter-cell interference ratio (f) of approximately 1.5. Equations 13 and 14 show that reducing the necessary $E_b$ in CDMA system drives the total noise down and thereby increases the total network capacity. Given this, CDMA benefits greatly from advanced error coding schemes, which reduce the necessary $E_b/N_{tot}$ for a given bit error rate (BER). For this analysis, necessary $E_b/N_{tot}$ of 3 dB for a BER of $10^{-5}$ will be assumed. This BER is, in principle, achievable with Walsh error correcting codes and Gold pseudo-random spreading codes.

In light of the analysis above, a downlink performance analysis (satellite-to-user) can be determined. For example, received power ($P_r$) per user in dBW can be determined as follows:

$$P_r=EIRP_{cell}+G_r-L_p-L_s-10 \log(U), \quad (15)$$

where the variable ($EIRP_{cell}$) represents the equivalent isotropic radiated power per cell in dBW, the variable ($G_r$) represents the receive antenna gain in dB, the variable ($L_p$) represents the path loss in dB, the variable ($L_s$) in dB accounts for additional losses, and the variable (U) represents the number of channels (assumed to be at the perimeter of the cluster, which can be a worst-case scenario). In an embodiment (where spacecraft batteries supply the peak transmit power), the total $EIRP_{cell}$ may be 36.67 dBW, and the user gain (at minimum elevation) may be taken as 30 dB.

The path loss can be calculated as follows:

$$Lp=20 \log (4\pi R/\lambda), \quad (16)$$

where the variable (R) represents the path length in meters. The equation (16) yields a path loss ($L_p$) of approximately 184.62 dB, assuming the path length (R) of approximately 2,033 km (at the edge of the coverage area). The additional atmospheric losses are taken to be approximately 0.5 dB.

The number of channels operating simultaneously at 12 Mbps at the edge of the cluster was taken to be 10 per polarization. According to the above numbers, the received power per user ($P_r$) can be determined as follows:

$$P_r=36.67 \text{ dBW}+30 \text{ dB}-184.62 \text{ dB}-0.5 \text{ dB}-10 \log (10)=-128.95 \text{ dBW}. \quad (17)$$

The system thermal noise density ($N_o$) in dBW/Hz can be calculated from system temperature ($T_s$) as follows:

$$N_o=10 \log (kT_s), \quad (18)$$

where the variable (k) is the Boltzmann's constant. The system temperature is the sum of the antenna temperature and the receiver temperature. On a clear day, the temperature of the receive antenna operating at 20 GHz is about 15 K at 90-degree elevation and about 80 K at 20-degree elevation. The receiver noise figure can be about 2 dB, or 169.62 K at 290 K reference temperature. Thus, the total system noise temperature ($T_s$) may be approximately 23.97 dB-K at 31-degree elevation. The system thermal noise density is then approximately −205.13 dBW/Hz.

Using the above noise result and equation (17), the per user carrier-to-noise ratio (C/N$_o$) is about 76.18 dB/Hz for clear sky conditions. Taking the data rate to be 12 Mbps gives a carrier energy to noise ratio (E$_b$/N$_o$) of above approximately 5.39 dB in clear weather at the lowest elevation angles.

In addition to the thermal noise, inter-channel interference must be accounted for in CDMA. In Equation (13), the expression (α(1+f) U E$_b$ R$_b$) represents the total received carrier power (C) from channels (including neighboring cells). Thus, the interference noise (L$_o$) in dBW/Hz can be determined as follows:

$$I_o = C/B_c, \quad (19)$$

where the variable (B$_c$) represents the total RF bandwidth, taken to be 1 GHz for this example. Using the received total carrier power of −118.95 dBW (obtained by subtracting 10 log (U) from the result of equation (17)) gives the interference noise (L$_o$) of negative 213.51 (−213.51) dBW/Hz. Multiplying the received carrier power per user by the data rate and dividing by the variable (I$_0$) gives E$_b$/I$_o$ of approximately 9.79 dB. Comparing the energy-to-noise density ratio E$_b$/N$_o$ and the energy-to-interference ratio E$_b$/I$_o$ shows that the propagation losses and available power can be the limiting factors in this specific scenario.

Adding the noise density (N$_o$) and the interference noise (I$_o$) gives the total noise density of approximately −203.78 dBW/Hz and a carrier energy to total noise ratio E$_b$/N$_{tot}$ of approximately 4.04 dB in this case. Further, capacity (or fading) margin (CM) can be calculated before the link closure, and the excess link margin can be evaluated. For this calculation, it can be assumed that 3% of active users are in the worst case fading conditions and require an extra 3 dB in carrier power, while 97% of users are in the nominal fading condition and require an extra 1 dB of carrier power to combat fading. Capacity reduction factor can then be determined according to the following equation:

$$C_F = \frac{E_b/N_{tot}}{0.97 E_{bnom} + 0.03 E_{bwcs}}, \quad (20)$$

where the ratio E$_{bFnom}$/N$_o$=E$_b$/N$_o$+1 dB represents the nominal fading margin and the ratio E$_{bFwcs}$/N$_0$=E$_b$/N$_o$+3 dB represents the worst-case fading margin. The capacity margin (CM) can be related to the capacity reduction factor (C$_F$) in dB according to the following equation:

$$CM = 10 \log_{10}(C_F), \quad (21)$$

Equations 20 and 21 give a capacity margin (CM) of approximately −1.08 dB (or C$_F$ of 0.78) in this example. Further, the excess link margin can be calculated as follows:

$$\text{ExcessLinkMargin(dB)} = \frac{E_b}{N_{tot}} - 10\log_{10}\left(\frac{1}{(E_b/N_{tot})^{-1}_{min} - C_F(E_b/I_o)^{-1}}\right), \quad (22)$$

which yields above 1 dB of excess link margin.

The preceding calculation shows the link closure in a situation when a total of 20 channels are operating simultaneously at 12 Mbps in a cell at the edge of the cluster. Since each satellite may include 100 cells, the total throughput of a satellite can be determined according to the following equation:

$$100 \text{ cells} * 20 \frac{\text{channels}}{\text{cell}} * 12 \frac{\text{Mbps}}{\text{channel}}, \quad (23)$$

which yields 24 Gbps for each satellite. This basic analysis establishes a baseline performance of the first layer and provides an estimate of the size, power, and weight of the necessary hardware. In some instances, the process for determining the baseline performance may be much more complex, since the power and data rate may be dynamically allocated between cells and adjusted for each cell to account for the actual distribution of users, fading conditions, and temporal data activity. Moreover, once the constellation is fully deployed, the performance of each satellite may further improve since the elevation angles can be lower. Despite the underlying complexities, the baseline throughput gives a sense of scale for a constellation of satellites 200. For example, once fully deployed, the constellation can provide a continuous coverage of the continental United States, which may be covered by 13 clusters. Such a configuration may provide a total throughput for the continental United States of 13×24 Gbps, or 312 Gbps.

In light of the analysis above, an uplink performance analysis (user-to-satellite) can be determined. There are a number of differences between the uplink and the downlink. In the above-baseline implementation, user stations may transmit to the satellites at 30 GHz. This transmission frequency may increase the path losses by about 3.5 dB. Assuming 3 dBW transmit power from an active user station, the received power at the satellite is about-131 dBW from a user that is at the edge of the cluster.

The 30 GHz receivers on the satellite may have higher noise temperatures than those on the ground because the satellite is looking at the Earth's surface, which has a noise temperature close to 300 K. Assuming the same receiver noise figure, the resulting noise power density is about-214 dBW/Hz.

The total inference noise at the satellite receiver can strongly depend on the exact implementation. Assuming similar interference ratios as in the downlink, a data rate of 3 Mbps can be supported with reasonable margins.

In light of the analysis above, the link between the gateway Earth stations to the satellite link may be determined. In some embodiments, connection to the public switched telephone network and the Internet backhaul can be served with one gateway teleport station per satellite footprint. In some embodiments, three phased-array antennas may be included at each gateway station. The power and size limitation on the earth station may be more relaxed, so the antennas can have a gain of 63 dB and transmit power of greater than 500 W, providing a high total received carrier power to noise density ratio (C/No) on the uplink. This transmit power also enables use of higher order modulation methods to drastically improve bandwidth efficiency.

To facilitate communication, the satellites 200 may be equipped with multiple antennas at 20 GHz and 30 GHz to provide the desired gateway channels at different uplink and downlink frequencies.

In certain embodiments, the constellation of satellites may utilize a variety of strategies to minimize or reduce interference between the LEO satellites and unrelated GSO operators and between satellites of the constellation and other NGSO operators. The International Telecommunication Union (ITU) and independent sovereign nation administrative agencies set frequency regulation limits for radio operators. Both GSO and NGSO system licenses have already been issued to many operators. These services share the Ka Band frequencies. The ITU has set equivalent power flux density limits (EPFD) for any NGSO satellites that cross the users' line of sight relative to the GSO operators. These limits as adopted at the World Radio Conference 2000 (WRC-2000) cover the C, Ku, and Ka bands of operation. This limitation is set at angle separation of ±10° over the GSO band. The EPFD limits are given in Article 22 of the ITU for different various antennas sizes and usage factors.

The multi-layer NGSO-GSO constellation of the present disclosure may utilize dynamic, spatiotemporal electronically and mechanically steered agile antennas to overcome the EPFD and angle diversity limit while providing worldwide service across the entire globe. Moreover, the arrangement of the satellites within the constellation at various layers and altitudes and the electronically and mechanically steered antennas of the satellites may facilitate global communications at high throughput for both uplink and downlink communication paths.

With regard to the user terminal (e.g., a smart phone, a tablet computing device, or other satellite communication device), an adjustment may be provided with respect to the wireless antennas that may be used to communicate with the satellite constellation. Depending on the target market, the requirements for the user terminal may vary. In some embodiments, the user terminal may include or be connected to a phased array antenna, which may give the smallest form for a given gain. Further, the phased array antenna may require no moving parts, and can be conformal. A typical planar 20 GHz phased array with 30 dB gain may have a diameter of 23 cm and the 30 GHz array may have a diameter of about 16 cm. The user would need both, yielding a user device that would have to be about 39 cm in diameter or about 28 cm by 28 cm (as a reference, iPad® that is commercially available from Apple Computer, Inc. of Cupertino, California is about 25 cm by 18 cm). In some embodiments, to facilitate communications using smaller devices, an external device may be coupled to the smart phone by a connector or by a wireless communications link, and the external device may receive signals from the smart phone and amplify the signals for transmission to the satellites within the constellation.

Figure 4:
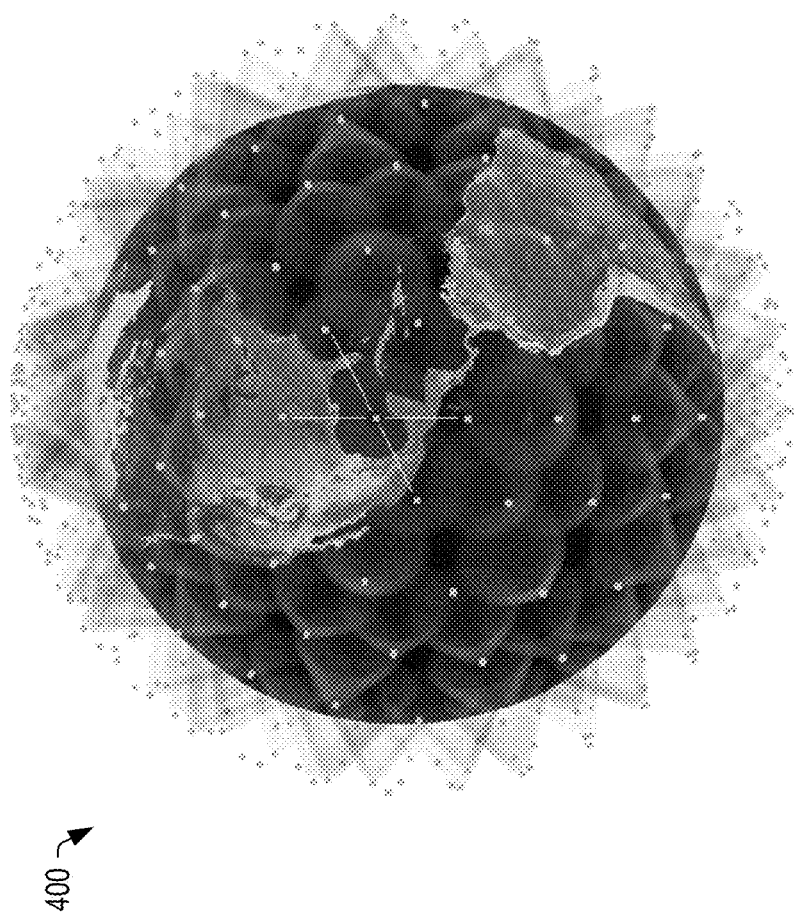
FIG. 4 depicts a portion of a demand responsive portion of the high throughput satellite system of FIG. 1 including a multi-layer low earth orbit satellite constellation, in accordance with certain embodiments of the present disclosure.

As the number of satellites grows, the elevation angles and available multiple coverage (overlapping beams) may reduce the size of the user antenna. Depending on the elevation angles and the coverage, the size of the antenna may be reduced to about 10 cm by 10 cm and may be compatible with any of the smart phones on the market FIG. 4 depicts a multi-layer low earth orbit satellite system, in accordance with certain embodiments of the present disclosure. The multi-layer low earth orbit system is generally designated as 400. In the view of FIG. 4, ground tracks of a LEO constellation with 378 of the satellites (excluding six in GEO) that form the system 400 are depicted on the Earth's surface.

The system 400 can be used to implement a "demand responsive" system that can be implemented in stages to provide cost effective and high throughput data and voice communications. In some embodiments, the system 400 may be deployed in tiers or layers, progressively, to provide a demand driven technology and space-switched network system. The system 400 may include a plurality of LEO satellites deployed in three stages and at multiple orbital distances from the Earth's surface in order to provide a low-latency (e.g., less than 30 mS) system that is available approximately 99.7% of the time for LEO only operation and more than 99.9995% for the multi-layer LEO/GSO deployed system. The satellites may be configured to detect and link to one another dynamically to link a plurality of LEO satellites to form a multi-layer, multicomponent communications mesh to enable the system 400. Thus, the system 400 can provide enterprise assured reliability and quality of service network during terrestrial disasters. Further, the system 400 can provide guaranteed capacity and speed services as well as broadband satellite communications on-the-move. Finally, the system 400 can ensure that government, military, and commercial communication services are maintained.

Further, deployment of multiple satellites at multiple altitudes and embedded channelization and packet processing functionality enable failover functionality to bypass off-line or malfunctioning devices to facilitate communication through re-routing of the data. Additionally, the effects of interference can be minimized by redundancy in data transmission through different communication paths, enabling reliable intra and inter-satellite communication to enable fast, reliable, and secure point-to-point communication.

In certain embodiments, the system 400 may include a plurality of LEO satellites, each having a power capacity of one to two kilowatts and providing data throughput of approximately 16 Gigabits per second per satellite. Up to approximately 378 satellites may be deployed across three layers, progressively, to form a satellite mesh or constellation of LEO satellites. A plurality of GEO satellites may be licensed or deployed for a total of 384 satellites in the constellation. With this configuration, the system 400 may provide global communications in the Ka, Ku, and V bands.

As global demand for information is increasing, existing systems are struggling to keep up with the demand. In particular, demand is increasing for data (Internet), high definition (HD) and ultra-high definition (UHD) video, geophysical data, remote sensing, Earth observation, global security and reconnaissance, and so on. There is a lack of terrestrial network infrastructure in emerging markets, and there is a lack of a ubiquitous infrastructure. Existing infrastructures are insufficient to meet the demand, and fiber is good for fixed broadband services but is not wireless and is too expensive to deploy worldwide. The system 400 provides a solution by allowing mobility, modular (staged cost) deployment, high throughput, and high quality of service. More importantly, deployment can be achieved without risking human life in remote regions, war-torn regions, or other dangerous areas.

In some embodiments, the system 400 may be configured to provide 12 Megabits per second (Mbps) download speeds. At maximum capacity of 324,000 subscribers, the system can still guarantee 1 Mbps download speeds. As new compression algorithms are deployed, higher transmission rates may be achievable, even at maximum capacity, and/or the maximum capacity can be increased. Other embodiments are also possible It should be appreciated that the capacity limitations mentioned above are based on an assumption that 100% of the data transmission traverses the satellite constellation and at full streaming capacity (e.g., a movie broadcast). However, the system 400 may cooperate with other systems, such as terrestrial microwave towers, land-based cabling (such as fiber cables, coaxial cables, and other cabling technologies), GEO satellites, MEO communications satellites, and LEO satellites. In some embodiments, through coordinated load balancing across a range of devices, high throughput rates may be possible at much higher subscriber rates.

In certain embodiments, the system 400 may include a layer one altitude of approximately 1,275 km and an inclination of 89.6 degrees. Each LEO satellite of the system 400 can incorporate two deployed active phased array antennas. The two antennas may be configured to produce approximately one hundred (48) beams each that can illuminate the Earth's surface within an approximate circular area having a diameter of about 2,894 km each. In some embodiments, the satellites of the system may utilize the Ka-band spectrum (30 GHz uplinks; 20 GHz downlinks). In some embodiments, the satellites of the system 400 may use the Ku-band spectrum, the Ka-band spectrum, the V-band spectrum, one or more other frequency bands, or any combination thereof, as defined by the International Telecommunication Union (ITU).

In certain embodiments, each satellite may weigh approximately 200 kg and can generate up to about 2.5 kW of DC power. Assuming a conversion efficiency of 25%, the total available radio frequency (RF) power can be approximately 500 W at 20 GHz.

In the illustrated example, the highest constellation layer of the system 400 was chosen at 1275 km to keep the satellites under the bottom of the Van Allen radiation belt. At this altitude, the orbital period is calculated at approximately 110 minutes. The system 400 can be deployed as a single satellite or as a plurality or constellation of similar satellites that occupy the same spherical altitudes, and cooperate together in performing a communication mission.

The LEO system 400 can be configured to provide a minimum of 12 Mbps down and 3 Mbps up. In general, it is assumed that, at any given time, not all communication devices will be utilizing the network at this capacity, so it is acceptable to assume a 10:1 or even 50:1 contention rate in some rare cases.

The satellite antennas of the system 400 may provide 100 multiple beams with a total available RF power of to the antenna of approximately 500 W. In some embodiments, the satellites of the system 400 may utilize programmable dual circular polarizations translating to approximately 5 W per beam. In some embodiments, the coverage area of each circular beam may be approximately 200 km on the earth's surface.

In some embodiments, such as when a downlink beam is partially over ocean, uninhabitable terrain or areas with less demand in general, the transmit power from the unused beams can be transferred to beams that are more occupied or are in need.

In an example, a gateway earth station that connects the satellite links to the Internet may be required within each 1,000 km zone served by the satellite. In such an instance, there may be thirteen to fifteen gateway earth stations in the United States. In some embodiments, each gateway earth station may include three tracking antennas, be it mechanical or phased array.

In some examples, the gateway antennas can have a gain of 57-63 dB and transmit power of several hundred watts to provide a higher CNR on the uplink, which allows the use of higher order modulation to minimize gateway bandwidth. The satellite can carry multiple antennas at 20 GHz and 30 GHz to create multiple channels for uplink and downlink frequencies.

In some embodiments, the system 400 may be configured to avoid interference in the Ka-band spectrum from other NGSO constellations or GSO satellites. Angular, space and EPFD active limiting will be employed when the LEO satellite passes across the GEO satellite line of sight. In some embodiments, a user communication device may be configured to switch to another LEO satellite beam, a higher frequency GEO dedicated satellite as proposed in this embodiment at V-Band.

It should be appreciated that each tile of the active phased array antennas of the satellite devices may include embedded channelization and packet processing functionality, which can enable point-to-point communication through the network of satellites using selected paths and selected channels, avoiding multiple ground hops and numerous interactions with gateways and their associated landing rights and corresponding loss of security and resiliency.

Figure 5:
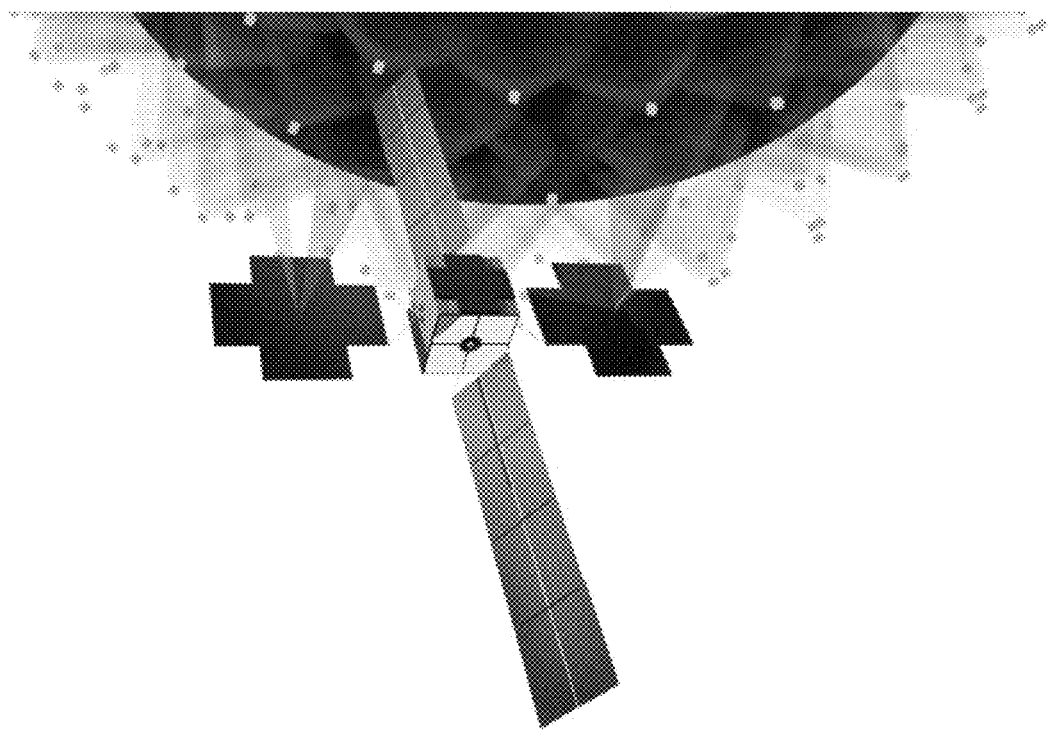
FIG. 5 depicts a perspective view of a low earth orbit satellite that can be used with the multi-layer low earth orbit satellite system of FIG. 1, in accordance with certain embodiments of the present disclosure.
Figure 5:
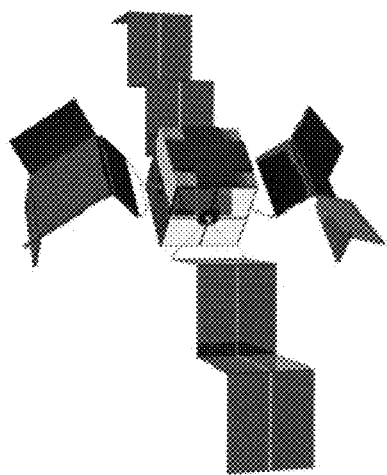
Figure 5:
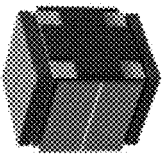

FIG. 5 depicts a perspective view of a low earth orbit satellite 500 that can be used with the multi-layer low earth orbit satellite system 400 of FIG. 4, in accordance with certain embodiments of the present disclosure. In the illustrated example, the LEO satellite 500 may include two antennas to provide the connection to user terminals through 100 beams that can cover a surface area of the Earth. One of the antennas may be used for downlinks in the 20 GHz band and the other antenna may be used for uplinks in the 30 GHz band. It is also possible that both antennas can be utilized in transmit and receive mode utilizing a diplexer to separate the receive and transmit signals. The antennas may include a multi-beam phased array antenna configured to generate about 100-200 beams.

The satellite 500 may also include two solar wings or solar panels, which may convert solar energy into usable power for storage and for operations of the satellite. In some embodiments, the two solar wings or solar panels may be folded during transport and unfolded and extended during orbit raising and operation using actuators within the solar wings.

The satellite 500 may also include a satellite bus or structure coupled to the antennas and the solar panels. The bus may be configured to secure and protect charge storage elements (such as batteries) power management and distribution, communication switching circuitry, and command and data handling, propulsion and guidance, navigation and control subsystems. In some embodiments, the bus may also include data storage elements (both non-volatile and volatile). Non-volatile data storage elements may be configured to store instructions that can be executed by the onboard computer(s) to control operation of the satellite 500. Further, in some embodiments, the instructions may be updated by remote data communication from a trusted terrestrial gateway or one of the GEO satellite components of the network, which can adjust operations. In an example, a particular encoding algorithm may be added or updated to enhance transmission and reception efficiencies. Other embodiments are also possible.

In some embodiments, in addition to the phased array directed toward the surface of the Earth, the satellite 500 may include one or more arrays configured to communicate with other satellites 500 in the same layer of the constellation, with other satellites 500 at other altitudes, or any combination thereof. In some embodiments, each satellite 500 may be configured to detect other satellites 500 within a broadcast range and may dynamically configure intersatellite communications to facilitate data throughput across the system 400. Each of the phased array antennas may include one or more actuators configured to mechanically adjust one or more of the tiles. Further, each tile may include embedded channelization and packet processing functionality to enable point-to-point communications at better than fiber speeds and with optimal flexibility, security, and resiliency.

In some embodiments, with 100-200 beams available with frequency reuse, the capacity of the satellite should reach from 16 to 40 Gbps. The system 400 may require around 1-2 GHz of RF bandwidth to achieve full frequency reuse.

Figure 6:
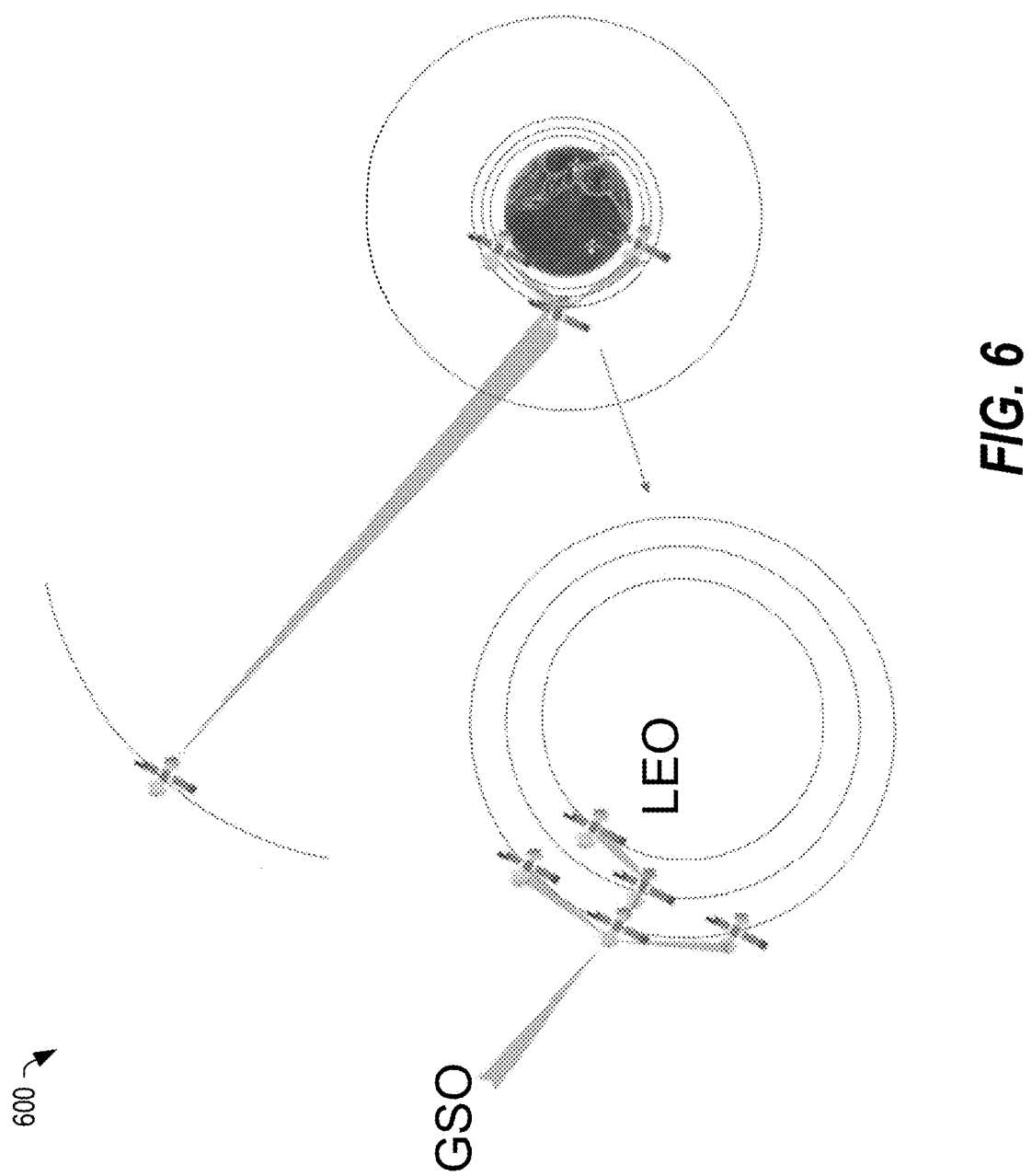
FIG. 6 depicts a view of a multi-component communication system including the multi-layer low earth orbit satellite system of FIG. 1, in accordance with certain embodiments of the present disclosure.

FIG. 6 depicts a view of a multi-layer, multi-component communication system 600 including the multi-layer low earth orbit satellite system 400 of FIG. 4, in accordance with certain embodiments of the present disclosure. The system 600 enables dynamic spatiotemporal beams. The satellites 500 of the system 400 can be configured to work with other LEO satellites 500 at different altitudes, with planned MEO satellites, with existing GEO satellites, or any combination thereof. In the illustrated example, the configuration complements existing and future small GEOs and complements existing and planned MEOs. Further, the configuration enables multiple, progressively deployed LEO altitudes.

In the illustrated example, a GEO satellite is depicted at a first high earth orbit and two LEO satellites are shown at a second low earth orbit. The three satellites may cooperate to provide beam coverage of a selected area. The LEO satellites, the GEO satellites, and a terrestrial communication device may communicate, allowing the communication device to send data to all three satellites concurrently, and the satellites (GEO and LEOs) may transmit the data through different communication paths to the destination device, providing redundant data communication and enhanced throughput as a system.

Figure 7:
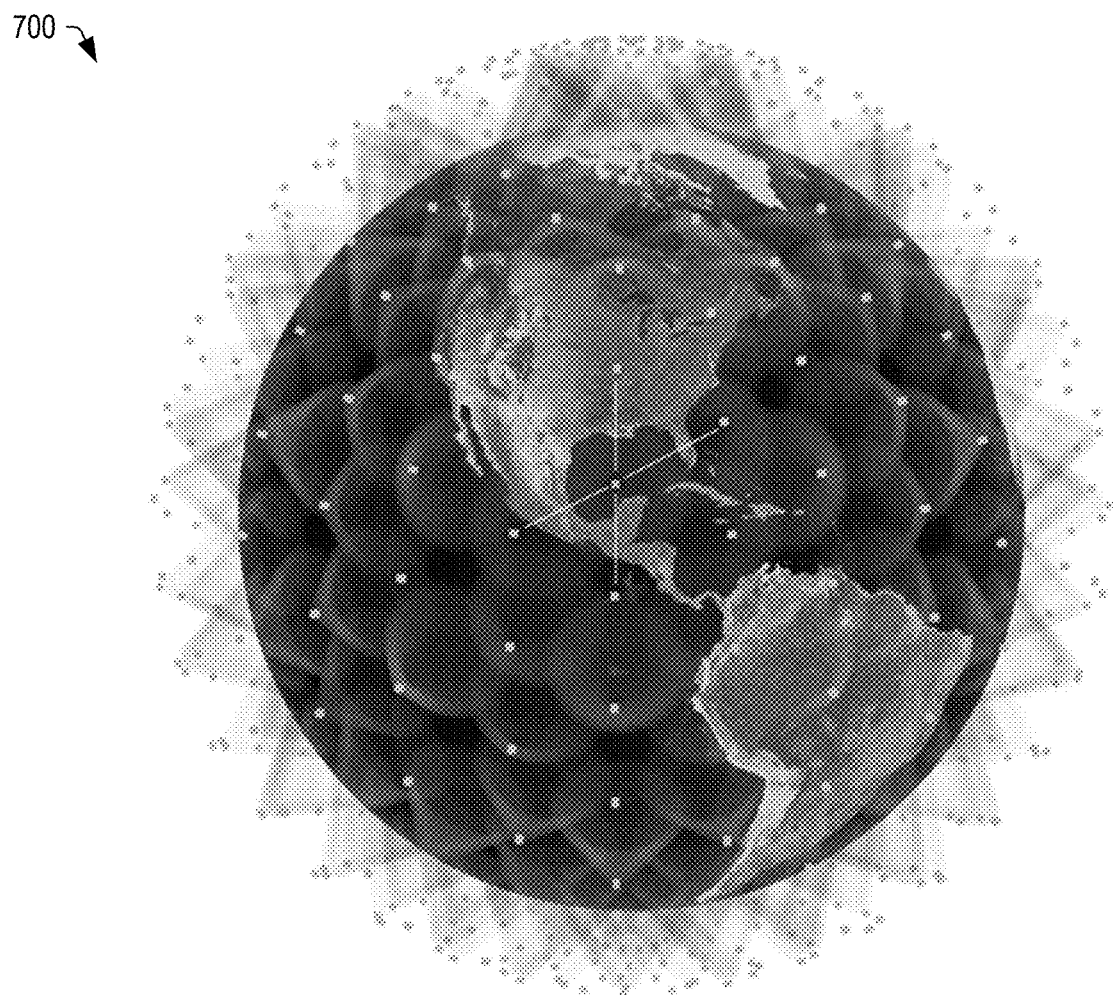
FIG. 7 depicts an enlarged view of the multi-layer (multi-component) communication system of FIG. 6 including beam footprints on the Earth's surface, in accordance with certain embodiments of the present disclosure.

FIG. 7 depicts an enlarged view of the three-dimensional communication system 600 of FIG. 6 including beam footprints on the Earth's surface, in accordance with certain embodiments of the present disclosure. In this example, the three-layer and one GEO layer communication system 600 may be an embodiment of the system 400 of FIG. 4. The system 600 includes a plurality of satellites 500 (in FIG. 5) deployed at a plurality of layers within the LEO orbit range. Further, the system 600 may include a plurality of GEO satellites and optionally one or more MEO satellites.

Terrestrial communication devices, including mobile phones, tablet computers, and other devices may be configured to transmit data to one or more base stations (or optionally directly toward the satellites 500), depending on the implementation. In a base station type of configuration, the base station may receive the signal from the communication device (i.e., user device) and amplify and direct the amplified signal toward a plurality of the satellites. The data may be sent in the form of a packet that includes one or more address fields indicating at least two LEO satellites and at least one of an MEO satellite and a GEO satellite, depending on the implementation.

The receiver may receive broadcast signals and may utilize a rake receiver to appropriately receive a multi path, multi satellite signal for optimum throughput. By utilizing at least two identifiers to form a "diversity code", the communications devices and the satellites can avoid interfering with other communication devices or other satellites. Further, the received data can be forwarded, retransmitted, or otherwise passed to an intended destination device through multiple paths, providing redundant transmission for improved throughput and enhanced reception. Other embodiments are also possible.

In the illustrated example, multiple substantially circular beam footprints are shown to overlap, providing global communication coverage. This particular implementation may include 378 LEO satellites deployed at multiple levels or layers within the LEO orbital range, and an additional 6 GEO satellites. However, in other embodiments, a different combination of LEO, MEO and GEO satellites may be employed to provide similar coverage.

Figure 8:
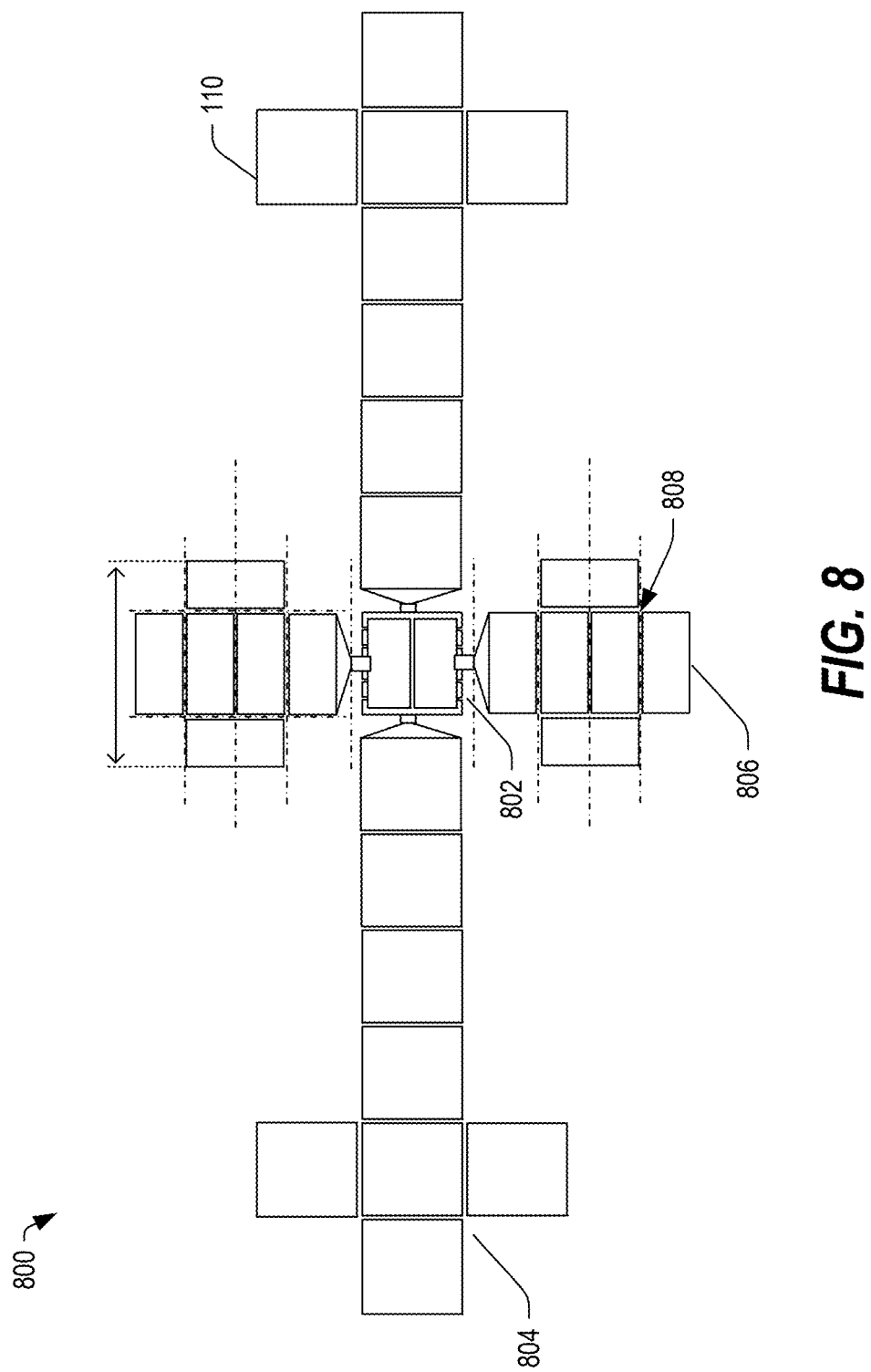
FIG. 8 illustrates a block diagram of a low earth orbit satellite that can be used with any of the systems of FIGS. 1-7, in accordance with certain embodiments of the present disclosure.

FIG. 8 illustrates a block diagram of a low earth orbit satellite 800 that can be used with any of the systems of FIGS. 1-7, in accordance with certain embodiments of the present disclosure. In some embodiments, the LEO satellite 800 is an embodiment of the LEO satellite of FIGS. 1-7. The satellite 800 may include a satellite bus or body 802, a pair of deployable solar wings or solar panels 804 coupled to the satellite bus 802, and a pair of deployable phase array antennas 806 configured to transmit and receive data. The satellite 800 may further include a plurality of actuators 808 that can be used to deploy the solar panels 804 to harvest energy from sunlight to power operation of the circuitry housed within the satellite bus 802 of the satellite 800. The actuators 808 can be included within the bus 802 and within a support assembly of the solar panels 804 in order to facilitate deployment. During transit, the solar panels 804 may be retracted into a compact form factor to facilitate transportation to the appropriate altitude where, upon deployment, the solar panels 804 may be extended.

The satellite 800 may further include a plurality of actuators coupled to the phased array antennas 806. At least some of the plurality of actuators may be configured to extend and retract the phased array antennas 806. In an example, the phased array antennas 806 may be retracted into a compact form factor to facilitate transportation to the appropriate altitude where, upon deployment, the phased array antennas 806 may be extended, mechanically oriented, and electrically steered or beam shaped. In some embodiments, the phased array antennas 806 may include one or more actuators configured to mechanically adjust one or more of the panels of the phased array antennas 806. Further, each multiple of the standard panels may be electrically steered or shaped in response to signals from control circuitry within the satellite bus 802. The actuators of the phased array antennas 806 may mechanically and electronically articulate individual panels of the deployed antenna phased arrays to limit equivalent power flux density interference when the LEO (NGSO) segment of the constellation is in direct view of the pre-existing GSO operators. Other embodiments are also possible.

The satellite bus 802 may be configured to secure and protect charge storage elements (such as batteries) power management and distribution circuitry, communication switching circuitry, tracking, telemetry and control, propulsion and guidance, navigation and control subsystems. In some embodiments, the bus 802 may also include data storage elements (both non-volatile and volatile). Non-volatile data storage elements may be configured to store instructions that can be executed by an on-board computer (OBC) to control operation of the satellite 800 and optionally to control operation of the one or more actuators. Further, in some embodiments, the instructions may be updated by remote data communication from a trusted terrestrial source, which can adjust operations. In an example, a particular encoding algorithm may be added or updated to enhance transmission and reception efficiencies. Other embodiments are also possible.

In some embodiments, in addition to the phased array directed toward the surface of the Earth, the satellite 800 may include one or more arrays configured to communicate with other satellites 800 in the same layer of the constellation, with other satellites 800 at other altitudes, or any combination thereof. In some embodiments, each satellite 800 may be configured to detect other satellites 800 within a broadcast range and may dynamically configure intersatellite communications to facilitate data throughput across the system. The satellites 800, if deployed in the constellation disclosed herein, may cooperate to provide higher throughput and consistent data and voice delivery globally.

In some embodiments, the mechanical and electronic articulations of the deployed antenna phased arrays 806 may be controlled to limit equivalent power flux density interference when the LEO (NGSO) segment of the constellation is in direct view of the pre-existing GSO operators. Unlike fixed pitch and other satellite pitched alignment type of LEO satellites, the satellites 800 used in the constellation of satellites may include mechanically and electrically steered and shaped electromagnetic beams to facilitate communications between the users, gateways and the satellites of the constellation.

Figure 9:
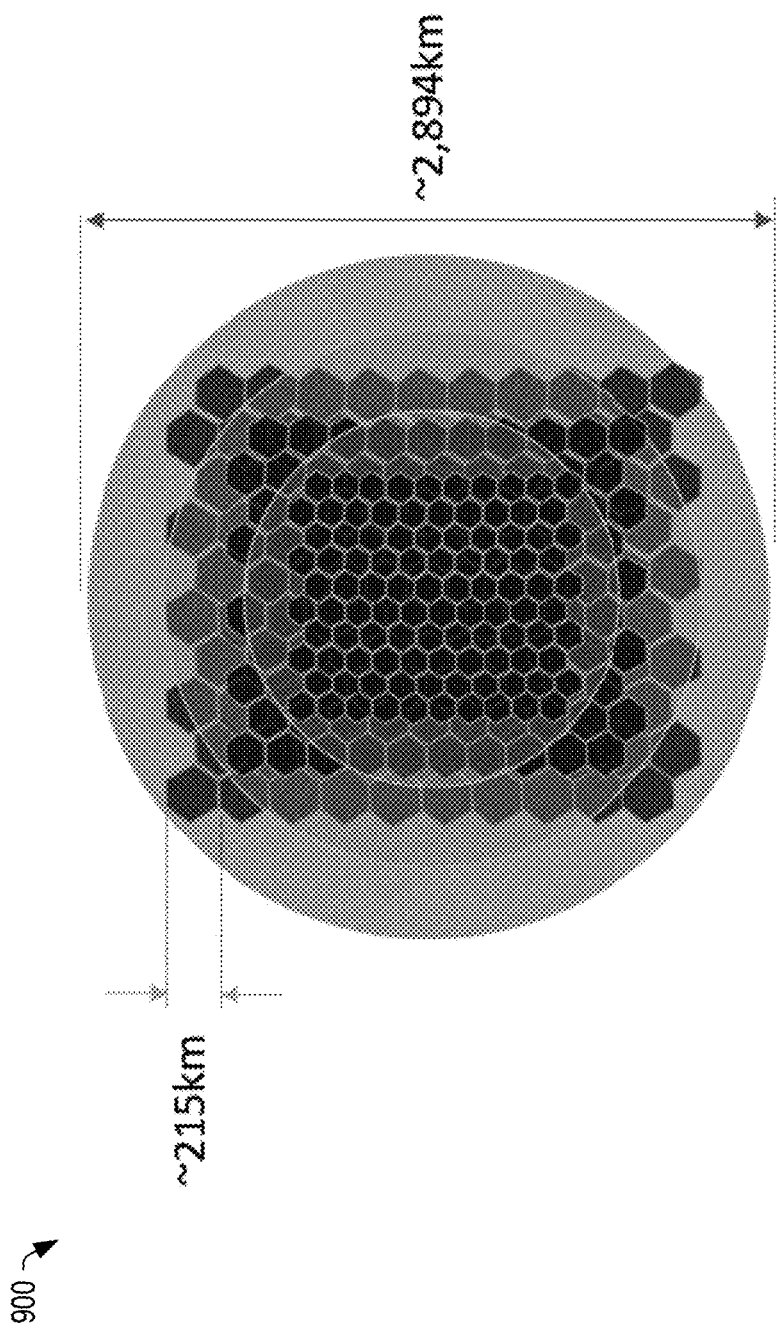
FIG. 9 depicts a possible satellite beam coverage footprint for a plurality of satellites at different altitudes, in accordance with certain embodiments of the present disclosure.

FIG. 9 depicts a satellite beam coverage footprint 900 for a plurality of satellites at different altitudes, in accordance with certain embodiments of the present disclosure. This coverage footprint 900 may represent the overlapping beams from a constellation of satellites of any of the systems of FIGS. 1-8 arranged at multiple levels. In this example, the footprint 900 includes a circumferential area that is approximately 2,894 km in diameter that includes RF coverage through three layers of shaped beams. The first layer may include as many as 100 spot beams, each with a diameter of 215 km. The second layer of shaped beams includes a plurality of beams, each tracing a footprint of approximately 110 km. Within the area, a third layer of shaped beams include a plurality of beams that each traces a footprint of about 55 km. Other embodiments are also possible.

Figure 10:
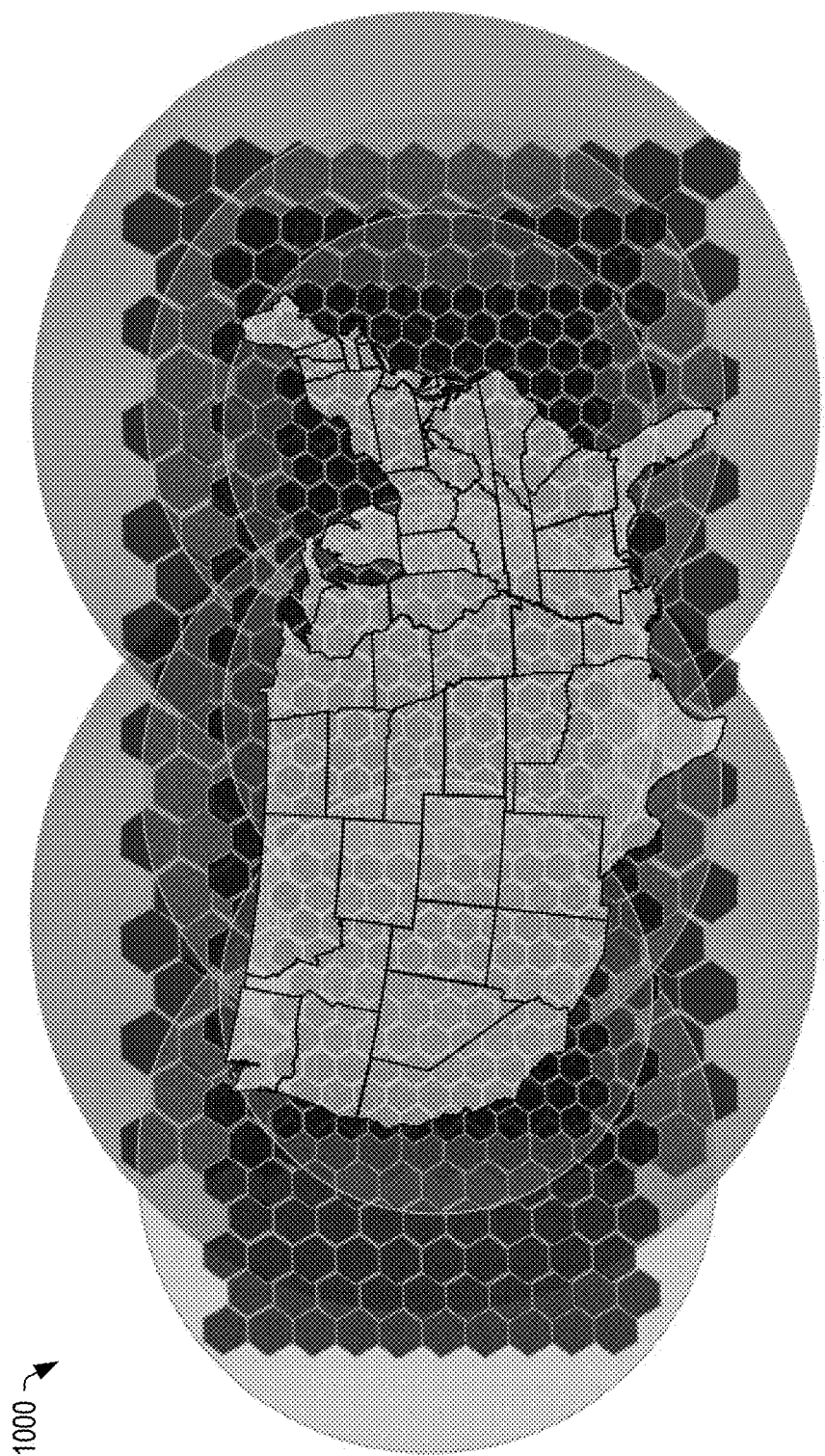
FIG. 10 depicts a satellite beam coverage footprint for a plurality of satellites at different altitudes superimposed on a map of the United States, in accordance with certain embodiments of the present disclosure.

FIG. 10 depicts a satellite beam coverage footprint 1000 for a plurality of satellites at different altitudes superimposed on a map of the United States, in accordance with certain embodiments of the present disclosure. The satellites deployed at the various layers, as described above with respect to FIGS. 1-9, may allow the system to produce a beam footprint that overlaps to provide global coverage and international communication capabilities. In some instances, to enhance throughput and to ensure downlink speeds, the satellites may be deployed such that the constellation density varies according to the subscriber base, providing more MEO satellites and/or LEO satellites in a densely populated subscriber area. Other embodiments are also possible.

Figure 11:
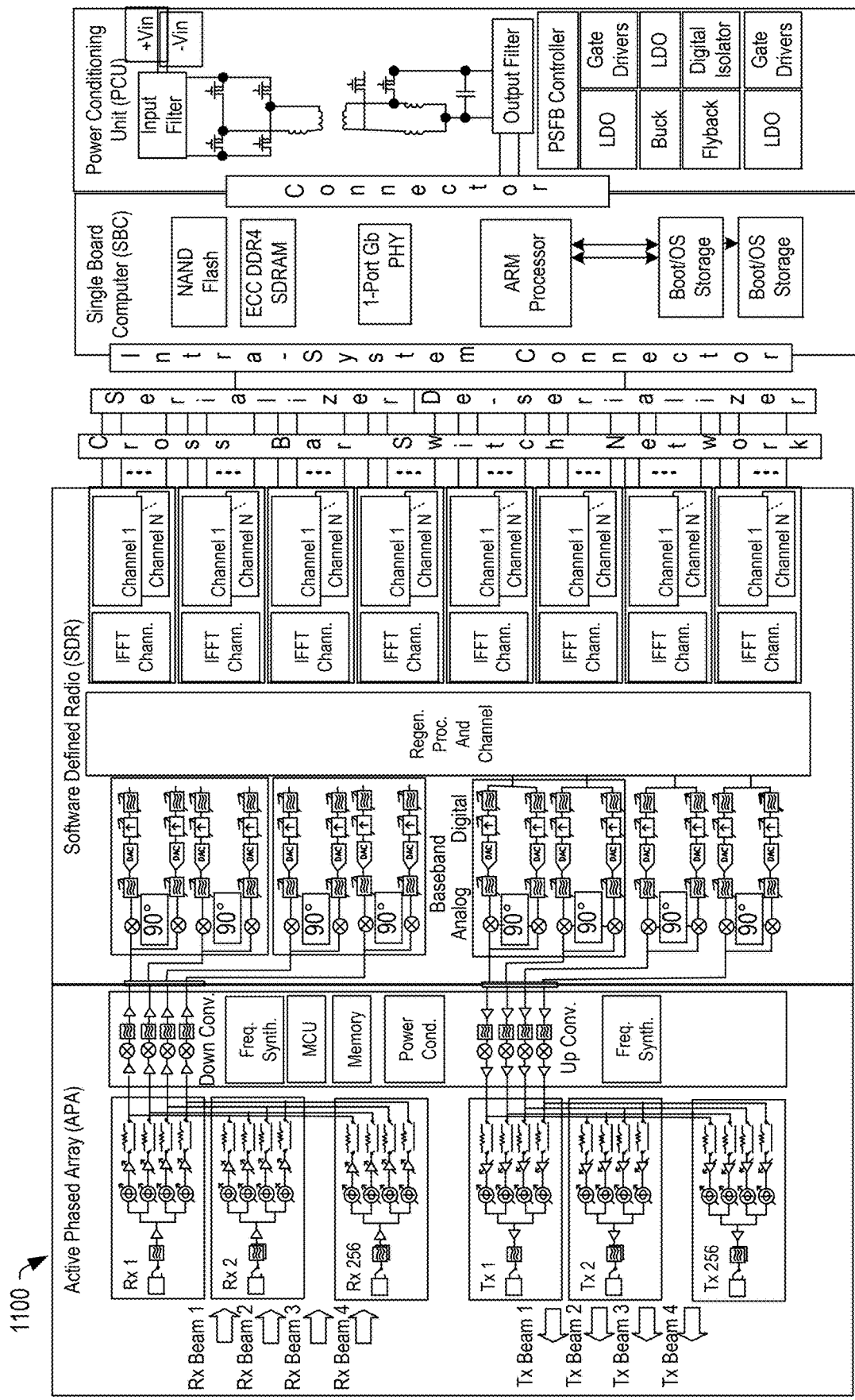
FIG. 11 depicts a block diagram of a communication device configured to send data and receive data via a multi-component, multi-layer communication, in accordance with certain embodiments of the present disclosure.

FIG. 11 depicts a block diagram of system 1100 including a modular, scalable, reconfigurable and software defined active phased array with embedded RF transmission and reception amplifiers, beamforming, frequency synthesizers, digital transceivers, embedded channelizer, modulator/demodulator, encoder/decoder, single board computer for packet traffic and beam management, packet routing, network management, and heuristic optimization. In addition, each active phased array may include its own power management system. This systems represents a bits-to-photons payload system in one configurable hardware/software package. Additional modules can be added to obtain more beams, more processing capability, larger apertures, other advantages, or any combination thereof.

In some embodiments, the satellite system 1100 may be configured to send data and receive data via a multi-layer, multi-component, diversity communication, in accordance with certain embodiments of the present disclosure. In some embodiments, the communication device may be a smart phone, another type of portable phone, a tablet computer, or another computing device. The communication device may include a digital/photonics beam-former/channelizer/processor (hereinafter "processor") coupled to an input interface, such as a keypad, touchscreen interface, another input device, or any combination thereof. The communication device may further include a memory coupled to the processor and configured to store instructions that, when executed, may cause the processor to perform various operations and to control communications. The communication device may also include communication circuitry (such as driver circuitry or dedicated satellite communication circuitry), which may be configured to energize a plurality of antennas (multi-beam phased array antennas) within the communication device to send data to a plurality of satellites, such as a first LEO satellite (#1), a second LEO satellite (#2) and a GEO satellite (#1).

The memory may include a code angle diversity module that, when executed, may cause the processor to utilize the communication circuitry to provide a plurality of identifiers within a portion of each transmission packet. In an example, the multi-layer, multi-component diversity module may cause the process to utilize data corresponding to each of a pair of LEO satellites and a GEO satellite to generate the packet and to simultaneously transmit data (directionally) to the LEO satellites and to the GEO satellite.

The memory may further include a communication module that, when executed may cause the processor to control the communication circuitry to prepare and send the packet. The memory may include applications that may be typically included in smart phone or other computing device. In a particular example, the multi-layer look angle diversity code module and the communication module may be part of an application that may be included within a computing device to enable the device to make use of the multi-layer satellite network.

In some embodiments, the satellite communication device may include a phased array antenna. A conventional phased array antenna with a gain of 32 dB may include a square aperture of approximately 12 m on a side. Steering a beam 60 degrees from vertical in any direction may utilize elements spaced no more than 0.5 wavelengths apart to avoid grating lobes.

In the illustrated example, the multi-beam phased array antennas are shown in phantom because they may be integrated within the communication device or may be coupled to the communication device through an interface. In the latter case, the antennas may be implemented as external antennas, which may be coupled to the communication device through a port, such as a Universal Serial Bus (USB) connector, a USB mini or other connector.

In the illustrated example, the active phased array antenna may include a plurality of tiles. Each tile may include one or more receive elements and one or more transmit elements. In some embodiments, an apparatus may include a modular, scalable, and software-configurable satellite device including active phased array antennas with embedded channelization and packet processing functionality. The apparatus may include a modular spacecraft bus coupled to a pair of deployable solar wings and coupled to a plurality of transmit/receive active phased array antennas. In some aspects, the active phased array antennas may include a plurality of receive elements coupled to inputs of low noise amplifiers (LNA), then to a digitally programmable phase shifter, a variable gain attenuator, a transmit receive switch, then a power combiner and ultimately a down converter, which has outputs coupled to analog-to-digital converter (ADC) circuit. The ADC circuit may provide outputs to a digital down sampler, then a finite impulse response filter (FIR) and then onto a regenerative processor and channelizer circuit. The regenerative processor and channelizer circuit which consists of a field programmable gate array may communicate with a processing circuit (such as a single board computer (SBC)) through a crossbar switch network, a serializer circuit, and an intra-system connector. The processing circuit may include an Advanced Reduced-Instruction-Set-Computer (RISC) Machine (ARM) processor. Further, the processing circuit may be coupled to a power conditioning unit through an external data converter. The receive elements, the phase shifters, the variable gain attenuators, the transmit/receive switch, the power combiner, the down converter circuit, the ADC circuit, the regenerative processor and channelizer circuit, the processing circuit, the crossbar switch network, the serializer circuit, the intra-system connector, and the power conditioning unit may be embedded within each tile of the active phased array antenna. The modular spacecraft bus may carry multiple phased array antennas and may facilitate communication between the various tiles.

In some aspects, the active phased array antennas may also include a digital-to-analog (DAC) circuit including inputs coupled to the processing circuit through the intra-system connector, a de-serializer, and a cross bar switch network, and the regenerative processor and channelizer consisting of a field programmable gate array (FPGA). The baseband digital data from the FPGA is then further processed by a half-band filter with digital pre-distortion functionality, gain stages, quadrature error correction circuit, FIR filter and interpolation, and then presented to a DAC. The output of the DAC circuit may be coupled to one or more transmit elements through an up-converter circuit, power dividers, filters, a power amplifier and an output power detector. Each of the DAC, the processing circuit, the intra-system connector, the de-serializer, the crossbar switch network, the up-converter circuit, the power combiners, the filters, power amplifiers, output power detector and the transmit elements may be embedded within each tile of the active phased array antenna. The modular spacecraft bus may carry multiple phased array antennas and may facilitate communication between the various tiles.

In some embodiments, the satellite device may be configured to utilize embedded channelization and packet processing functionality (utilizing a microcontroller unit within the active phased array and the regenerative processor and channelizer in conjunction with the processing circuit) to provide enhanced point-to-point communication through a mesh network of satellite devices while avoiding ground hops and avoiding numerous gateways with associated landing rights and loss of security and resiliency.

Figure 12:
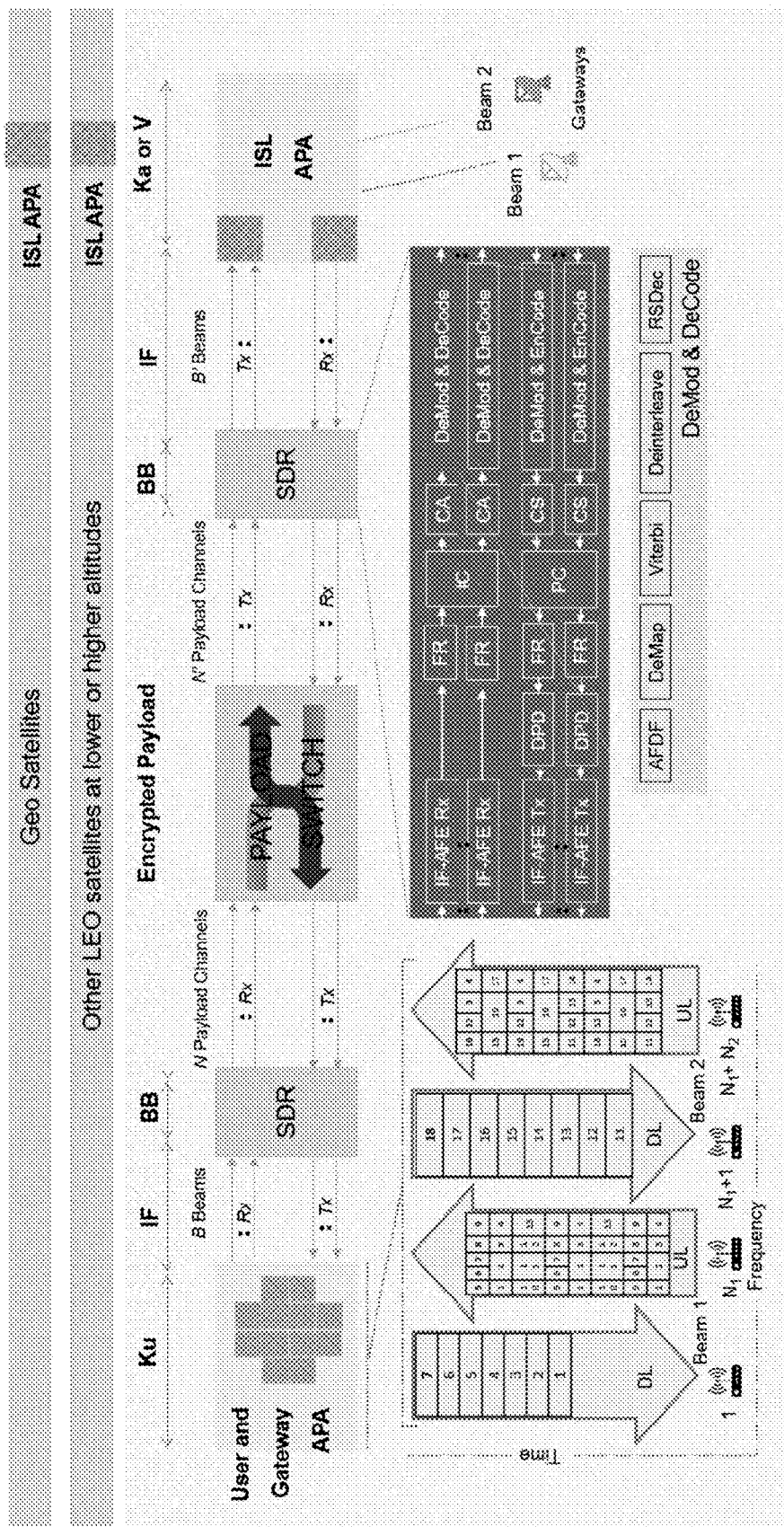
FIG. 12 depicts a block diagram of a communication system configured to facilitate communication between devices (on the ground, in the air, outside of the earth's atmosphere, or any combination thereof), in accordance with certain embodiments of the present disclosure.

FIG. 12 depicts a block diagram of a communication system 1200 configured to facilitate communication between devices (on the ground, in the air, outside of the earth's atmosphere, or any combination thereof), in accordance with certain embodiments of the present disclosure. In the example of FIG. 12, the signal packet structure and its interaction with the various components is graphically depicted. The beams are received and decoded, channelized, and repackaged for transmission via intra-satellite communication paths, inter-satellite communication paths, or any combination thereof. In the illustrated example, the system 1200 may include an adjustable franctional delay filter (AFDF), a baseband (BB) portion, a channel analyzer (CA), a channel synthesizer (CS), a de-interleaver (DeIntL), a de-mapper (symbols to bits or log-likelihood ratios) (DeMap), a digital predistortion module (DPD), a fractional resampler (FR), an inter-beam interference canceler (IC), an intermediate frequency (IF) portion, an IF analog frontend (IF-AFE), inter-satellite links (ISL), an inter-beam precoder (PC), a Reed-Solomon decoder (RSDec), and a software defined radio (SDR).

In conjunction with the systems, devices, and methods described above with respect to FIGS. 1-12, a system is disclosed that may include a plurality of modular, multi-phased array antenna satellites deployed at one or more altitudes and configured to provide a global communications network mesh. Each satellite device may include multiple phased array antennas. Further, each tile of the phased array antennas may include an embedded channelizer and packet processing functionality configured to enable intra-satellite and inter-satellite communication through the satellite network mesh and to facilitate point-to-point communication through the satellite network while avoiding ground hops.

Although the present invention has been described with reference to preferred embodiments, workers skilled in the art will recognize that changes may be made in form and detail without departing from the scope of the invention.

What is claimed is:

1. A communications system comprising:
   at least one modular satellite, each modular satellite including:
   a spacecraft bus;
   a pair of solar wings coupled to the spacecraft bus and configured to extend and retract, and further configured to generate electricity from received light;
   a plurality of electrical interconnects; and
   a pair of phased array antennas coupled to the spacecraft bus and communicatively coupled by the plurality of electrical interconnects, the pair of phased array antennas including a plurality of tiles, wherein one or more of the plurality of tiles is connected to one or more neighboring tiles by one or more articulating joints, each tile including circuitry including an embedded processing circuit configured to provide channelization and packet processing functionality.

2. The communications system of claim 1, wherein each modular satellite is configured to determine a communication path through a constellation of satellites including the at least one modular satellite to provide a point-to-point communication path avoiding multiple ground hops.

3. The communications system of claim 1, wherein the at least one modular satellite further includes a plurality of satellites.

4. The communications system of claim 3, wherein the plurality of satellites includes:
   a plurality of low earth orbit (LEO) satellites deployed at different altitudes and configured to communicate with one or more terrestrial devices and with one another at selected band frequencies;
   a plurality of geosynchronous (GEO) satellites deployed above the plurality of LEO satellites, each GEO satellite configured to operate at V or other frequency Bands such that a power flux density of one or more geostationary orbit (GSO) satellites is not interfered; and
   wherein the plurality of LEO satellites cooperate with one another and with the plurality of GEO satellites to provide a global communication having redundant point-to-point communication.

5. The communications system of claim 1, further including a communication device including at least two receivers configured to receive signals at frequencies greater than 10 GHz and at least two transmitters configured to send signals at frequencies greater than 10 GHz, the communication device configured to communicate with the at least one modular satellite.

6. The communications system of claim 5, wherein the communication device receives at 20 GHz and transmits at 30 GHz.

7. The communications system of claim 5, wherein the at least two receivers and the at least two transmitters are integrated within the communication device.

8. The communications system of claim 5, wherein the communication device transmits data packets including at least two identifiers corresponding to two different LEO satellites of a plurality of LEO satellites.

9. The communications system of claim 8, wherein, when a GEO satellite is in view, the communications device transmits the data packets including at least one identifier corresponding to the GEO satellite.

10. The communications system of claim 1, wherein each of the phased array antennas is configured to be mechanically and electronically articulated to limit equivalent power flux density interference when in direct view of a GEO satellite associated with another operator.

\* \* \* \* \*